United States Patent
Yamaoka et al.

(10) Patent No.: US 7,555,205 B2
(45) Date of Patent: Jun. 30, 2009

(54) METHOD FOR CONTROLLING DEFECT OF OPTICAL DISK, OPTICAL DISK RECORDING DEVICE, AND OPTICAL DISK REPRODUCING DEVICE

(75) Inventors: Masaru Yamaoka, Kadoma (JP);
Takashi Yumiba, Kyotanabe (JP);
Takahiro Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 812 days.

(21) Appl. No.: 10/494,614

(22) PCT Filed: Oct. 31, 2002

(86) PCT No.: PCT/JP02/11331

§ 371 (c)(1),
(2), (4) Date: May 4, 2004

(87) PCT Pub. No.: WO03/041074

PCT Pub. Date: May 15, 2003

(65) Prior Publication Data

US 2004/0258400 A1    Dec. 23, 2004

(30) Foreign Application Priority Data

Nov. 7, 2001   (JP) ............................. 2001-341687

(51) Int. Cl.
*H04N 5/00*    (2006.01)

(52) U.S. Cl. .................. 386/126; 386/95; 386/113; 386/125

(58) Field of Classification Search ................. 386/113, 386/126, 95, 125
See application file for complete search history.

(56) References Cited

U.S. PATENT DOCUMENTS 6,621,782 B1 *    9/2003    Nakane et al. ............. 369/53.1

FOREIGN PATENT DOCUMENTS

| JP | 07-073607 | 3/1995 |
|---|---|---|
| JP | 11-126426 | 5/1999 |
| JP | 2001-357533 | 12/2001 |

* cited by examiner

*Primary Examiner*—Thai Tran
*Assistant Examiner*—Girumsew Wendmagegn
(74) *Attorney, Agent, or Firm*—Wenderoth, Lind & Ponack, L.L.P.

(57) ABSTRACT

An optical disc recording apparatus (1) includes a system control unit (14) that judges whether main information and sub information which is recorded by being superimposed on said main information, relocates and records the main information or the sub information, or the main information and the sub information in a replacement area, when it is judged to be a defective area, and registers information in a defect management area in the optical disc, the information associating the defective area with the replacement area to which said defective area is relocated.

23 Claims, 25 Drawing Sheets

| | Presence/absence of defect | | Relocation process | | | |
|---|---|---|---|---|---|---|
| | | | Method A | | Method B | |
| | Main information | Sub information | Main information | Sub information | Main information | Sub information |
| | Defect | Defect | Relocation | Relocation | Relocation | Relocation |
| | Defect | Normal | Relocation | Relocation | Relocation | — |
| | Normal | Defect | Relocation | Relocation | — | Relocation |
| | Normal | Normal | — | — | — | — | ably used media capable of storing a

METHOD FOR CONTROLLING DEFECT OF OPTICAL DISK, OPTICAL DISK RECORDING DEVICE, AND OPTICAL DISK REPRODUCING DEVICE

TECHNICAL FIELD

The present invention relates to an optical disc defect management method, an optical disc recording apparatus and an optical disc reproduction apparatus, and more particularly to an optical disc defect management method, an optical disc recording apparatus and an optical disc reproduction apparatus for recording sub information by superimposing it on main information.

BACKGROUND ART

Optical discs represented by DVDs (Digital Versatile/Video Discs) are commonly used media capable of storing a large amount of digital data such as AV (Audio Video) data and computer data. For example, high-quality video which is over two hours in length is recorded on read-only optical discs for sale. In order to prevent such digital copyrighted works from being illicitly copied onto other recording media, a method known as content encryption is employed (See "Nikkei Electronics" Nov. 18 (1996): 13~14).

In the above method, compressed digital content such as movies is encrypted by the use of three-layered secret keys (title key, disc key, and master key) and recorded in a user information area accessible by a user. Of these secret keys, the master key, which is most important of all, is notified only to a licensed authorized manufacturer, while the disc key and the title key required for each DVD and title are encrypted on the basis of the master key, and stored in a control information area inaccessible by a user. This prevents a user's access to the secret keys required for decryption, and therefore an unauthorized copying such as by means of file copying cannot be carried out.

However, the above method allows encrypted content to be decrypted and reproduced by ordinary reproduction apparatuses, when the whole contents of a recording area including the control information area in which the secret keys are recorded, is illicitly copied onto another optical disc.

In response to this problem, there is a method, as shown in FIG. 1, for recording sub information onto an optical disc 2000, on which main information such as digital content is stored, by means of phase modulation to displace standard edge positions of recording marks 2001 that constitute the main information in the track direction by a minute amount (See Japanese Laid-Open Patent application publication No. 2001-357533). FIG. 2 is a timing chart showing major signals that are used in the above method at the time of recording. According to this method, a modulated channel signal C6 is obtained by means of phase modulation in which a channel signal C2 which constitutes main information is advanced by a minute amount when a PE modulated signal C5, which is obtained by performing PE modulation on a result of carrying out exclusive OR between a random number sequence C4 and sub information to be recoded, is "H", whereas the channel signal C2 is delayed by a minute amount when the PE modulated signal C5 is "L". According to such modulated channel signal C6, main information and sub information are recorded on an optical disc as modulated recording marks C7. In other words, main information and sub information are recorded onto an optical disc by means of phase modulation in which an edge of a standard recording mark C3, which constitutes the main information, is advanced by a minute amount in the track direction when the PE modulated signal C5 is "H" and is delayed by a minute amount in the track direction when the PE modulated signal C5 is "L". Accordingly, since sub information superimposed on the edges of recording marks cannot be copied even if the whole contents of a recording area including the control information area is illicitly bit-copied onto another optical disc, it becomes impossible for an ordinary reproduction apparatus and the like to decrypt an illicitly copied optical disc, by recording information including secret keys as sub information.

However, the above existing technique is not capable of verifying whether sub information is normally recorded or not, although it is capable of verifying whether main information is normally recorded or not. Thus, there might arise a problem that even if main information is normally recorded, sub information which is supposed to be superimposed in the same area, has failed to be recorded. For example, in the case where a content decryption key is recorded as sub information, when an area is reproduced in which only main information is recorded normally and in which sub information failed to be recorded normally, it is impossible to decrypt the encrypted content because the sub information cannot be reproduced normally.

Furthermore, in the existing technique, defect management is conducted, for example, in accordance with the linear replacement algorithm and the like, which is one of the defect management processes intended for DVD-RAMs, when an area is judged to be a defective area where main information cannot be recorded normally. In the linear replacement algorithm, when a defective area is found at the time of verifying recorded information, such area is relocated to a spare area which is provided in advance within an optical disc user area. Then, the respective top sector numbers of such defective area and its corresponding replacement area are registered and managed as an entry pair in a secondary defect list (SDL) which exists in a lead-in area and a lead-out area of an optical disc. Moreover, the above defective area and replacement area are provided in a unit of ECC block (16 sectors) and relocation processing is performed on an ECC block basis.

FIG. 3 is a conceptual diagram showing an existing linear replacement processing. As shown in FIG. 3A, inside an optical disc are: a user area 1701 in which main information is stored by forming optically-readable recording marks and in which sub information is stored by displacing their recording mark edges by a constant minute amount; a spare area 1702 intended for relocation used when the user area 1701 is a defective area; and, as shown in FIG. 3B, a secondary defect list (SDL) 1703 for managing the respective top sector numbers of a defective area and a replacement area as an entry pair when such defective area is relocated to the replacement area (which is within the spare area 1702). For example, suppose that a first defective area 1704 and a second defective area 1705 are judged to be defective as a result of performing verification to see if main information is recorded normally or not. In such a case, both pieces of main information recorded in the first defective area 1704 and the second defective area 1705 are relocated to a first replacement area 1706 and a second replacement area 1707 inside the spare area 1702, respectively.

However, the existing defect management processing described above has the problem that only main information is relocated and recorded in a replacement area when an area is judged to be a defective area where main information cannot be normally recorded, causing sub information superimposed on such main information to be unable to be replaced and recorded.

Moreover, since only a reproduction error related to main information is detected in the existing technique at the time of reproducing an area where main information and sub information are recorded, reproduction processing keeps going on even when sub information has become uncorrectable or subject to error correction.

The present invention has been conceived in view of the above problems, and it is an object of the present invention to provide an optical disc defect management method, an optical disc recording apparatus and an optical disc reproduction apparatus capable of reproducing main information and sub information in a stable manner even when not only a defective area where the main information cannot be normally recorded is found, but also a defective area where the sub information superimposed on such main information cannot be normally recorded is found.

DISCLOSURE OF INVENTION

The optical disc defect management method according to the present invention is a defect management method for an optical disc on which main information is recorded by forming optically-readable recording marks, and on which sub information is recorded by superimposing said sub information on the main information, the optical disc defect management method comprising: a verification step of verifying whether or not the main information and the sub information have been recorded normally, every time a predetermined amount of main information and sub information are recorded; and a defective area management step of performing the following processes when it is judged in the verification step that one of (i) the main information, (ii) the sub information, and (iii) the main information and the sub information, has not been recorded normally: relocating and recording, in a predetermined spare area in the optical disc, one of (i) the main information, (ii) the sub information, and (iii) the main information and the sub information, regarding that a recording area where the recording has been performed is a defective area related to a recording of one of (i) the main information, (ii) the sub information, and (iii) the main information and the sub information; and registering, into a predetermined defect management area in the optical disc, information that associates the defective area with a replacement area inside the spare area to which said defective area has been relocated.

Furthermore, the optical disc recording apparatus according to the present invention is an optical disc recording apparatus for recording, on an optical disc, main information by forming optically-readable recording marks and recording sub information by superimposing said sub information on the main information, the optical disc recording apparatus comprising: a verification unit operable to verify whether or not the main information and the sub information have been recorded normally, every time a predetermined amount of main information and sub information are recorded; and a defective area management unit operable to perform as follows when it is judged by the verification unit that one of (i) the main information, (ii) the sub information, and (iii) the main information and the sub information, has not been recorded normally: relocate and record, in a predetermined spare area in the optical disc, one of (i) the main information, (ii) the sub information, and (iii) the main information and the sub information, regarding that a recording area where the recording has been performed is a defective area related to a recording of one of (i) the main information, (ii) the sub information, and (iii) the main information and the sub information; and register, into a predetermined defect management area in the optical disc, information that associates the defective area with a replacement area inside the spare area to which said defective area has been relocated.

Moreover, the optical disc reproduction apparatus according to the present invention is an optical disc reproduction apparatus for reading out main information and sub information by reading optically-readable recording marks from an optical disc, said sub information having been recorded by superimposing said sub information on the main information, the optical disc reproduction apparatus, comprising: a replacement area reproduction unit operable to reproduce one of (i) the main information, (ii) the sub information, and (iii) the main information and the sub information from a replacement area where a defective area is replaced and recorded, when an area from which the main information and the sub information are to be reproduced is said defective area related to a recording of one of (i) the main information, (ii) the sub information, and (iii) the main information and the sub information; and a reproduction error judgment unit operable to judge that there is a reproduction error in the main information and the sub information, while the area where said main information and said sub information are recorded is being reproduced.

In addition to the above, it is also possible to embody the present invention as an optical disc reproduction method that includes, as its steps, each of the constituent elements included in the optical disc reproduction apparatus, as well as a program for causing the optical disc recording apparatus to execute the steps of the optical disc defect management method and for causing the optical disc reproduction apparatus to execute the steps of the optical disc reproduction method. Also, such program can be distributed on a recording medium such as CD-ROM and via a transmission medium such as a communication network. Furthermore, it is also possible to embody the present invention as an optical disc on which information is recorded by use of the optical disc defect management method.

BEST MODE FOR CARRYING OUT THE INVENTION

The following gives a detailed explanation of the preferred embodiment of the present invention with reference to the drawings.

(Optical Disc Recording Apparatus)

Figure 1:
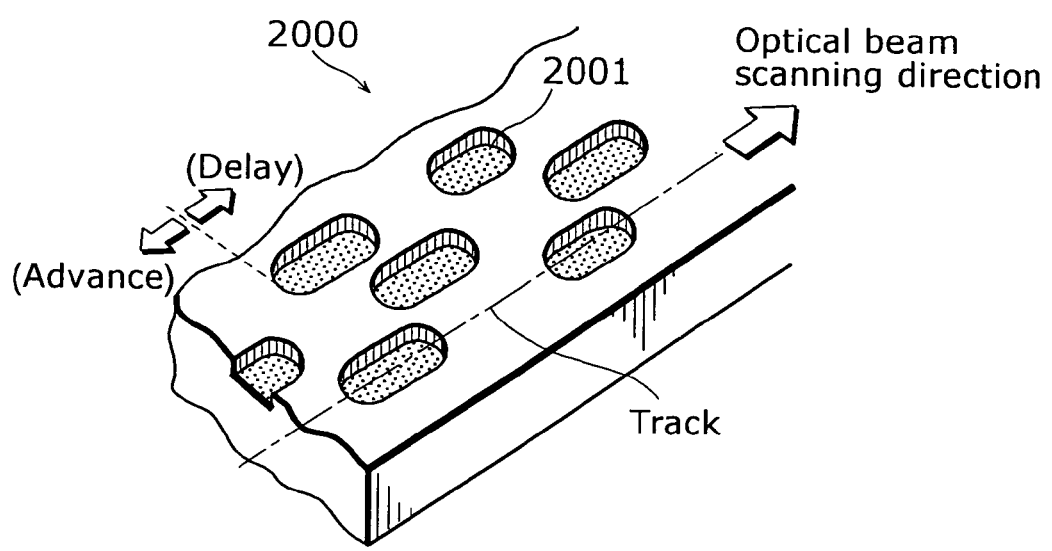
FIG. 1 is an external view showing a surface of an existing optical disc.
Figure 2:
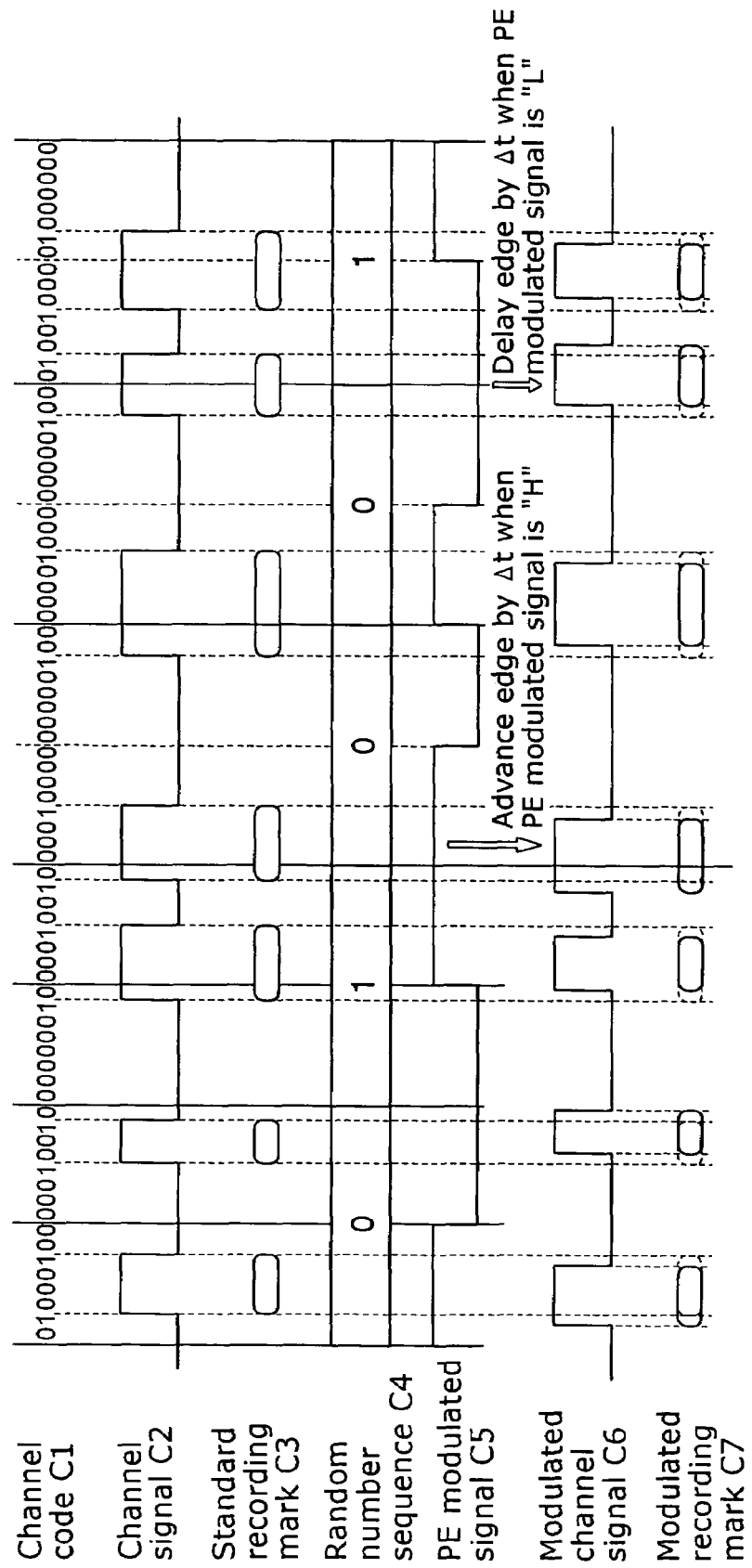
FIG. 2 is a timing chart showing major signals in an optical disc recording apparatus that records sub information by superimposing it on main information.
Figure 3:
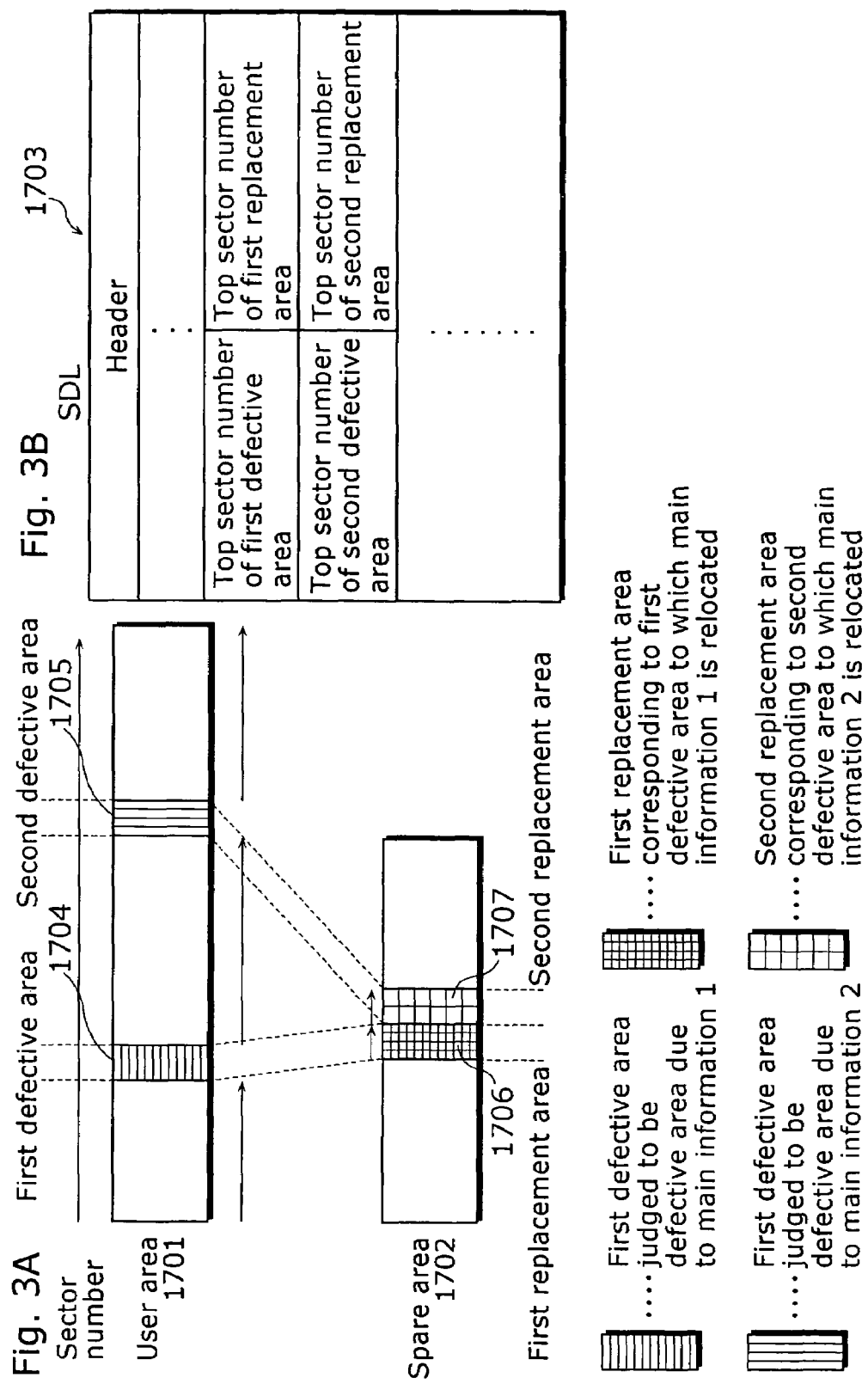
FIG. 3 is a conceptual diagram showing an existing linear replacement processing.
Figure 4:
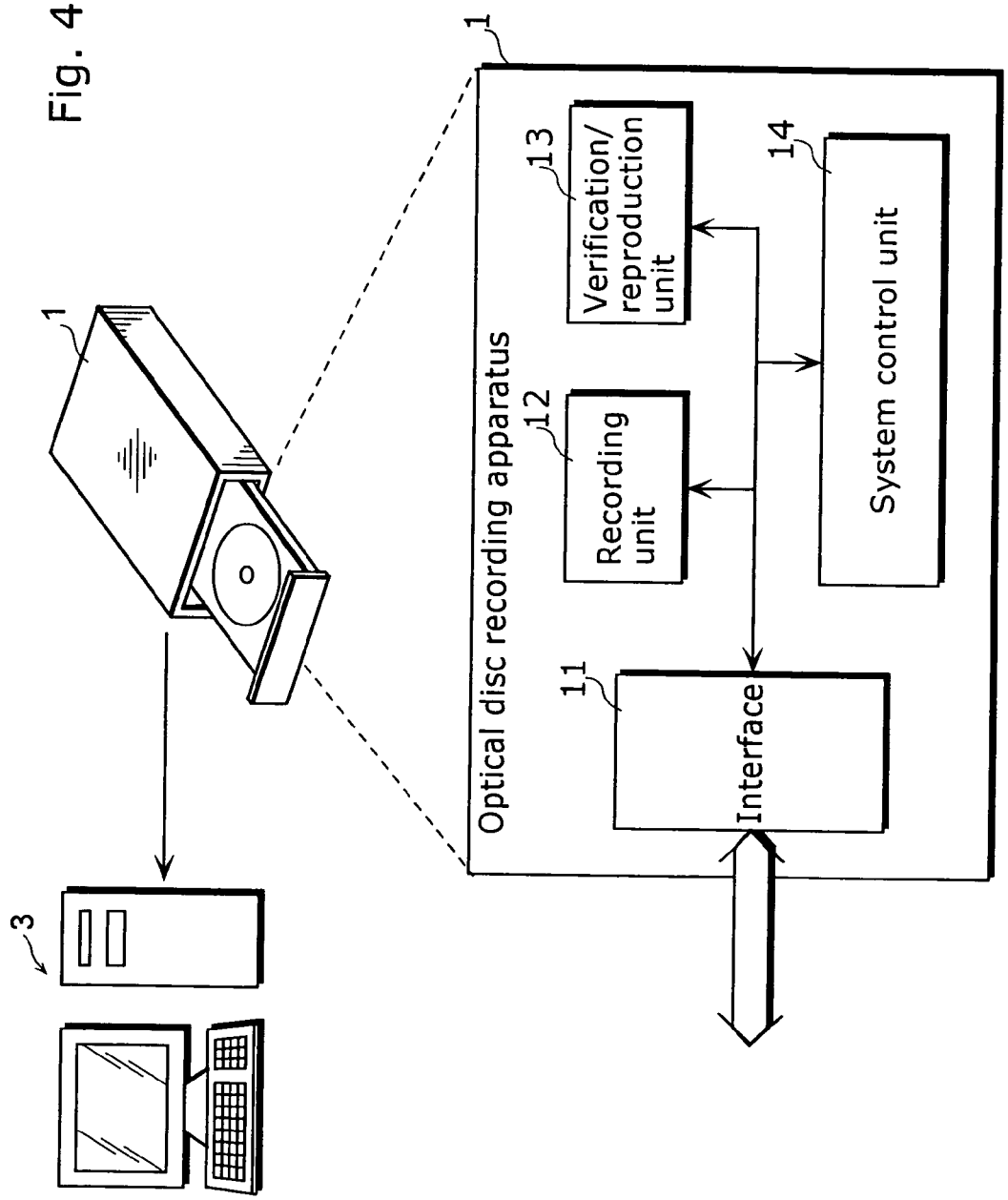
FIG. 4 is a block diagram showing a configuration of a preferred embodiment of an optical disc recording apparatus according to the present invention.

FIG. 4 is a block diagram showing the configuration of an embodiment of the optical disc recording apparatus according to the present invention. As shown in FIG. 4, an optical disc recording apparatus 1 is used being connected to or incorporated into an apparatus 3 such as a personal computer, and is comprised of an interface 11, a recording unit 12, a verification/reproduction unit 13, and a system control unit 14.

Figure 5:
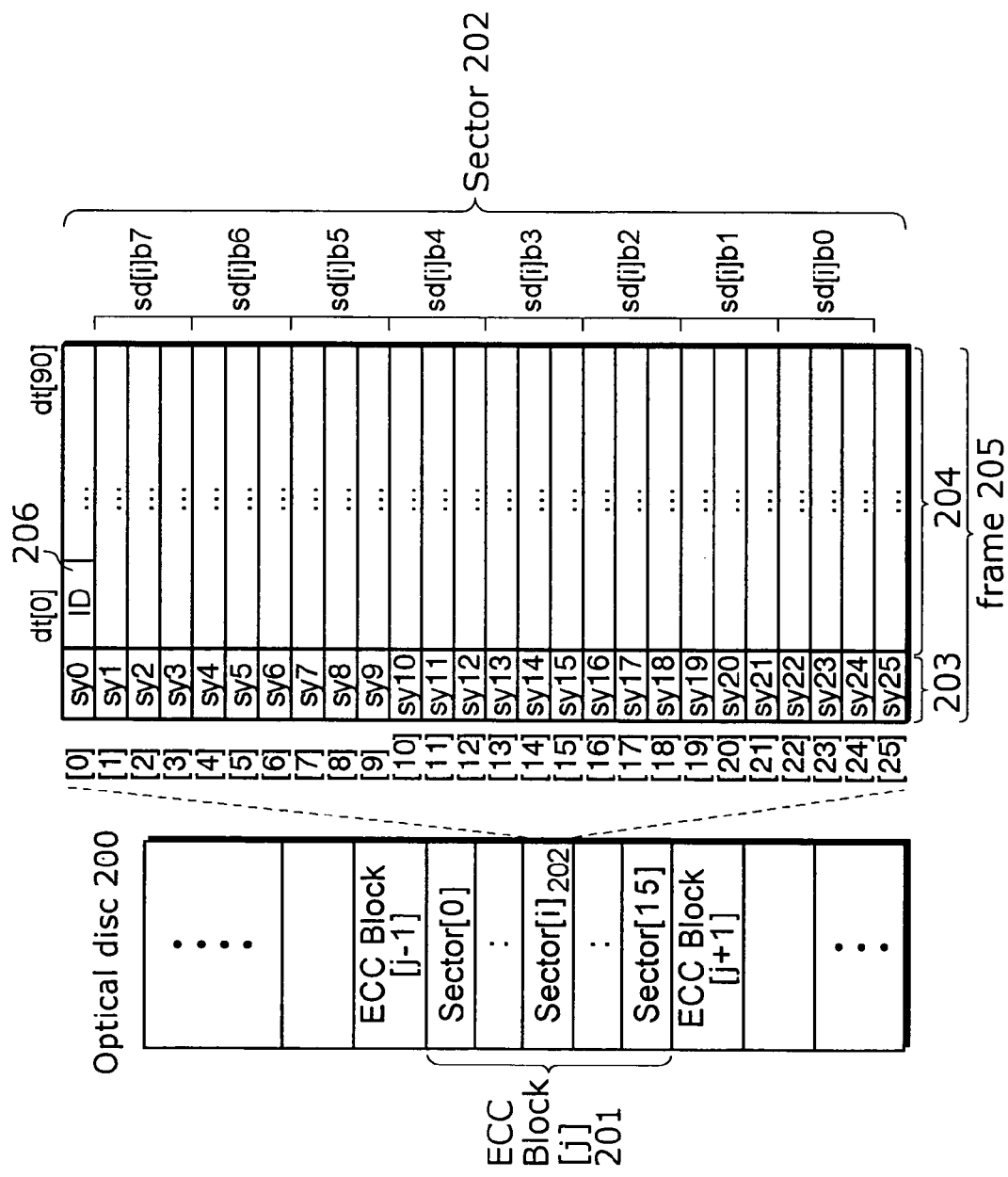
FIG. 5 is a data structure diagram showing an optical disc to be recorded by the optical disc recording apparatus.

FIG. 5 is a data structure diagram showing an optical disc to be recorded by the optical disc recording apparatus 1. In the present embodiment an explanation is given using a data structure of a DVD-RAM. An optical disc 200 has a sector structure in which a certain number of data items are included for recording main information. Moreover, the optical disc 200 is made up of ECC blocks 201, each of which includes 16 sectors in an integrated form, for the purpose of correcting an error in readout information. One sector 202 in an ECC block contains 26 frames 205 made up of synchronization areas 203 and data areas 204 in which main information is recorded.

A synchronization area 203 is intended for generating a timing signal for demodulating a subsequent data area 204. With reference to such timing signal, a data area 204 is demodulated every 16 channel bits so as to obtain main information. An address ID 206 for identifying a sector 202 is placed at the top of a data area 204 in the top frame, and such address ID 206 is used at the time of reproduction to find a sector 202 to be read out.

In FIG. 5, pieces of sub information are superimposed on recording marks in the data areas 204 included in frames except for the top frame of the sector 202 (the frame that includes the address ID 206) and the last frame (the next previous frame of the frame including the address ID 206), and 1-bit sub information is superimposed on a plurality of frames 205 (three frames in FIG. 5). For example, sub information sd[i]b4 is superimposed on recording marks that make up data areas 204 of the frames [10]~[12]. As a result, 8-bit sub information is recorded per sector, and 16-byte sub information is recorded per ECC block.

Figure 6:
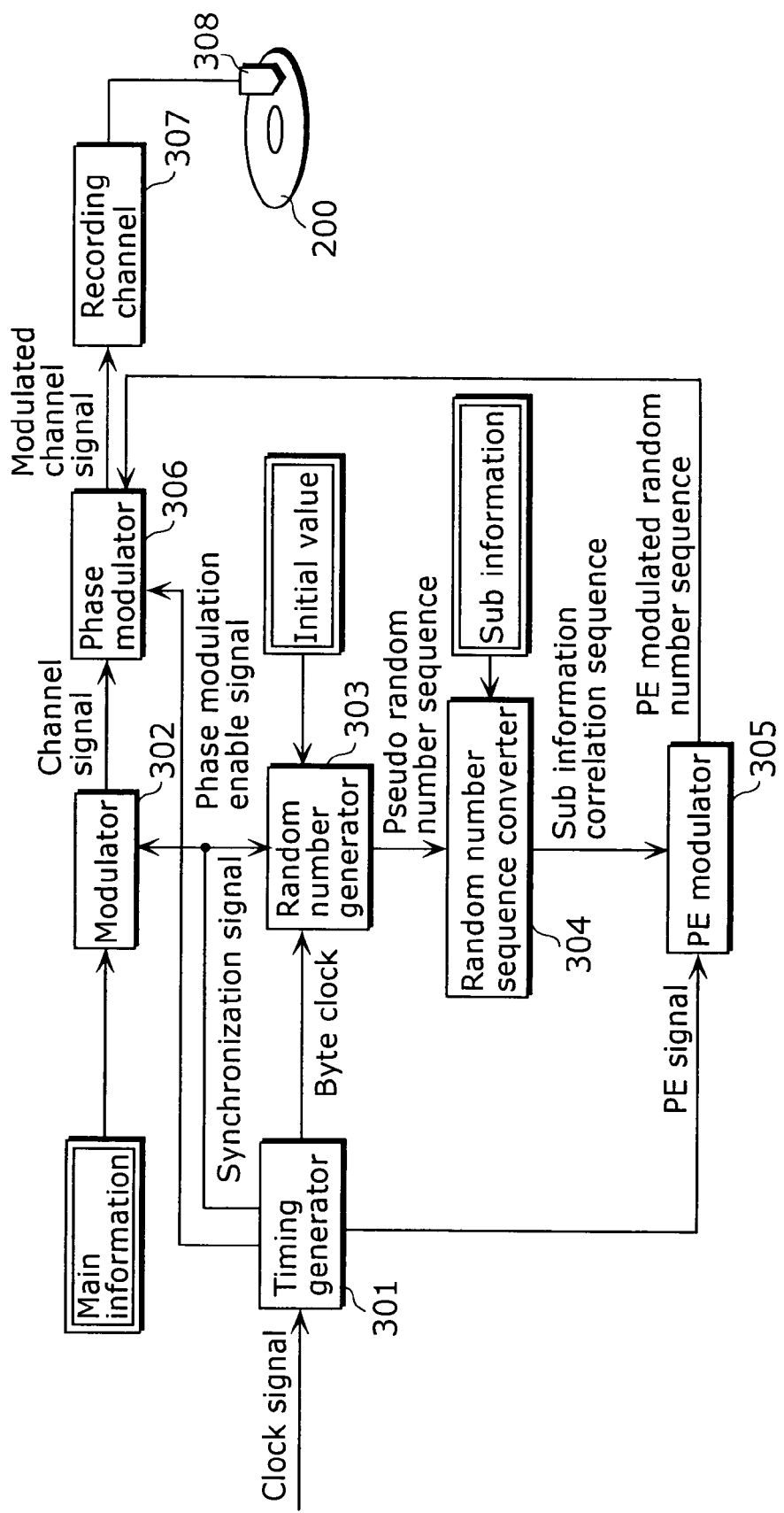
FIG. 6 is a block diagram showing a detailed configuration of a recording unit of the optical disc recording apparatus.
Figure 7:
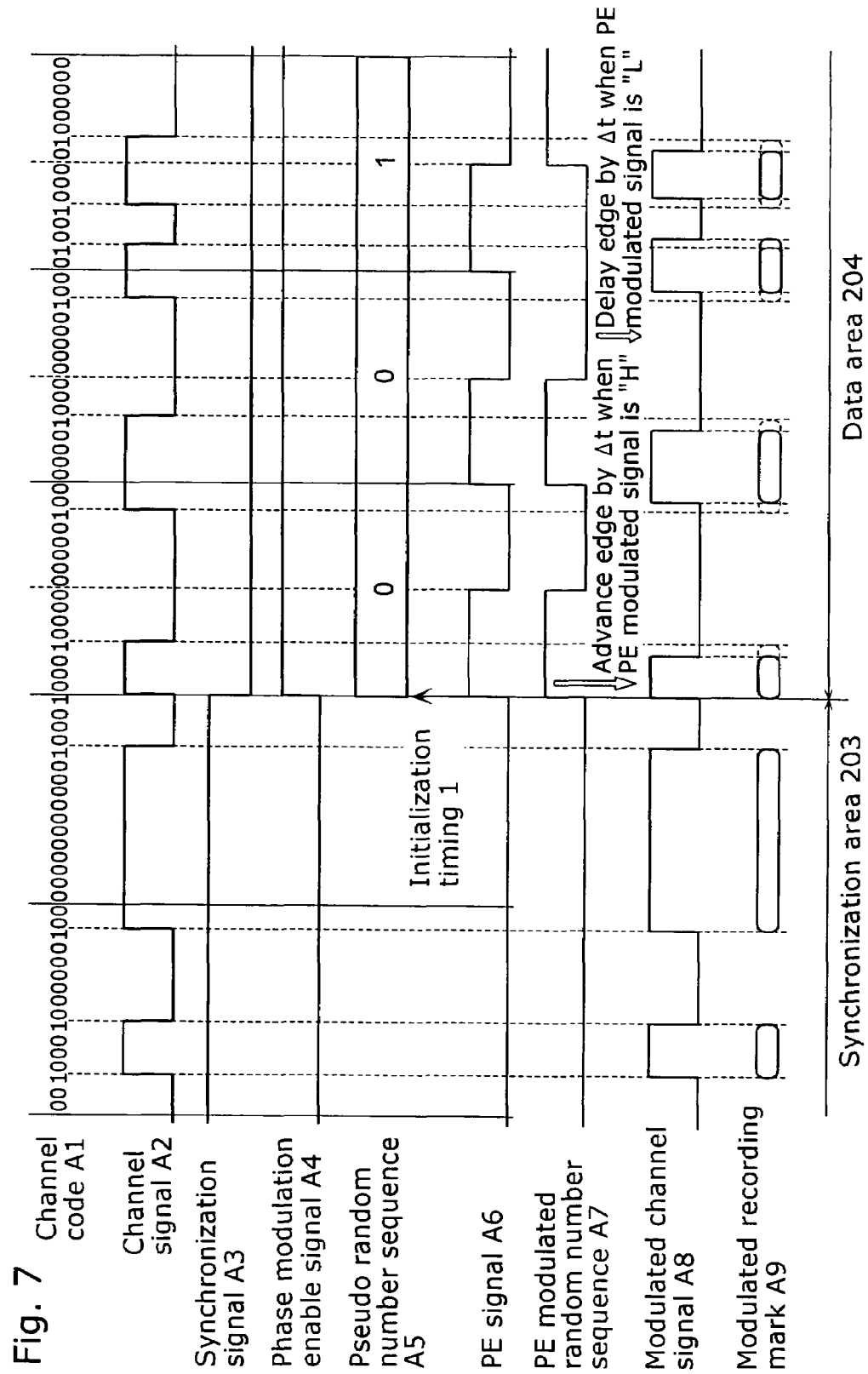
FIG. 7 is a timing chart showing major signals in the recording unit.

FIG. 6 is a block diagram showing a detailed configuration of the recording unit 12 of the optical disc recording apparatus 1, and FIG. 7 is a timing chart showing major signals used when recording main information and sub information. The recording unit 12 is intended for recording main information by forming optically-readable recording marks of an optical disc and for recording, at the same time, sub information by displacing the edges of such recording marks by a constant minute amount. As shown in FIG. 6, the recording unit 12 is comprised of a timing generator 301, a modulator 302, a random number generator 303, a random number sequence converter 304, a PE (Phase Encoding) modulator 305, a phase modulator 306, a recording channel 307, and a recording head 308.

The timing generator 301 outputs, to the modulator 302 and the random number generator 303, a synchronization signal A3 as shown in FIG. 7 for indicating timing at which synchronization patterns (synchronization areas) should be inserted into recorded data, when receiving a notification from the system control unit 14 instructing that the recording of main information and sub information should be started. Furthermore, based on such synchronization signal A3 and a clock signal from a clock generator not illustrated in the diagram, the timing generator 301 outputs a byte clock (which is a 16th of the frequency of the clock signal) synchronized with each byte of the recorded data, and outputs, at the same time, a PE signal A6 to the PE modulator 305 that enables H intervals and L intervals to be half and half in each byte, as shown in FIG. 7. Further, in order to record main information and sub information as shown in FIG. 5, the timing generator 301 outputs, to the phase modulator 306, a phase modulation enable signal A4, as shown in FIG. 7, indicating an area where sub information should be recorded (the data area of a frame which does not include the ID area).

The modulator 302 inserts a synchronization pattern (a synchronization area) into the input recorded data (main information) on the basis of the synchronization signal A3 from the timing generator 301, and at the same time, generates a channel signal A2 by performing NRZI conversion on such main information to be recorded after converting it into a corresponding 16-bit-long channel code shown in FIG. 7 on an 8-bit code (byte) basis, and outputs such channel signal A2 to the phase modulator 306.

The random number generator 303 pre-sets the initial value of a random number at the timing indicated by the synchronization signal A3 from the timing generator 301, and generates 1 bit of a pseudo random number sequence A5 at the timing indicated by the byte clock as shown in FIG. 7, and outputs it to the random number sequence converter 304.

The random number sequence converter 304 performs an operation that gives a correlation between the pseudo random number sequence A5 from the random number generator 303 and each bit of sub information to be recorded. In the present embodiment, the random number sequence converter 304 is configured to carry out exclusive ORs, and performs inversion/non-inversion of the pseudo random number sequence A5 depending on each bit of sub information to be recorded. The resulting random number sequence (sub information correlation random number sequence) is then outputted to the PE modulator 305. Sub information to be recorded is superimposed on 24 frames except for the top and the last two frames in each sector, and a bit of sub information is updated every three frames.

On the basis of the PE signal A6 from the timing generator 301, the PE modulator 305 generates a PE modulated random number sequence (PE modulated signal) A7 as shown in FIG. 7 by performing PE modulation on the sub information correlation sequence outputted by the random number sequence converter 304, and outputs such PE modulated random number sequence A7 to the phase modulator 306. Subsequently, as the PE modulated random number sequence A7, the PE signal A6 is directly outputted when the sequence (sub information correlation sequence) on which sub information is superimposed is 0 (rises down every 16-bit channels), whereas the PE signal A6 is outputted in an inverted form when the sequence (sub information correlation sequence) on which sub information is superimposed is 1 (rises up every 16-bit channels). Accordingly, it is possible to obtain such a signal as enables the number of 0 and 1 intervals to be approximately the same even in the case where there is a sequence of the same random number sequences.

The phase modulator 306 performs phase modulation for delaying or advancing the edges (when the phase modulation enable signal is "H") of only data areas in frames, as shown in FIG. 5, in which sub information is to be recorded, out of the channel signal A2 from the modulator 302, whereas it outputs, to the recording channel 307, the channel signal A2 without performing phase modulation on the other edges (when the phase modulation enable signal is "L").

Figure 8:
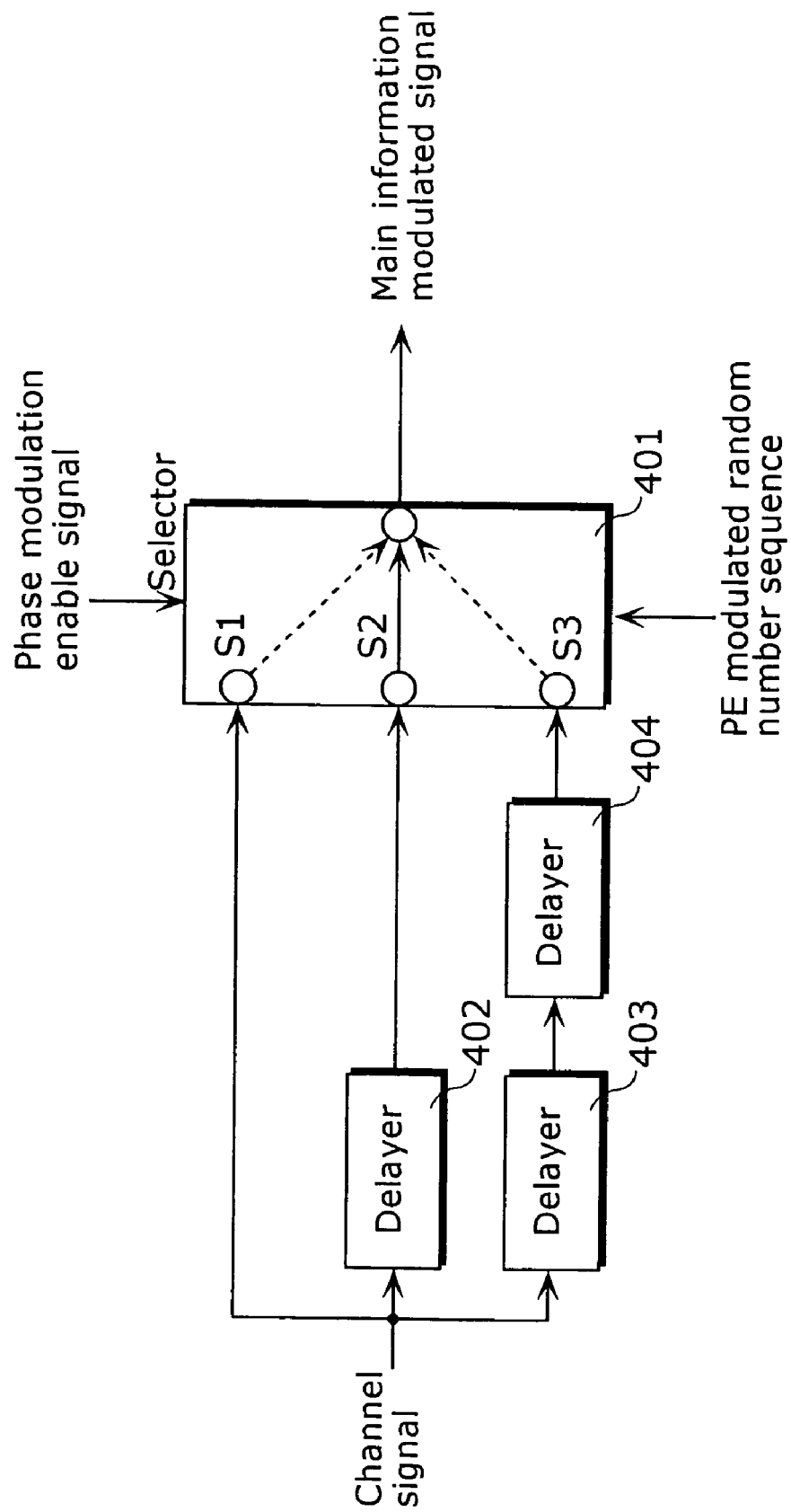
FIG. 8 is a block diagram showing a detailed configuration of a phase modulator of the recording unit.

FIG. 8 is a block diagram showing a detailed configuration of the phase modulator 306. The phase modulator 306 is made up of delayers 402, 403 and 404 for delaying a signal only for said minute period of time and a selector 401 that accepts three inputs and generates one output. The selector 401 outputs a signal S2 resulted by delaying the channel signal A2 inputted by the modulator 302 through the single delayer 402 when the phase modulation enable signal A4 inputted as a control signal is "0", outputs the channel signal A2 inputted by the modulator 302 as it is as a signal S1 when the phase modulation enable signal A4 is 1 and the PE modulated random number sequence A7 is 1, and outputs a signal S3 resulted by delaying the channel signal A2 inputted by the modulator 302 through two delayers 403 and 404 when the phase modulation enable signal A4 is 1 and the PE modulated random number sequence A7 is 0.

As a result, the phases of recording mark edges that are recorded on (i) ECC blocks on which no sub information is superimposed, (ii) important frames which store ID and the like, and (iii) synchronization areas of frames, are not changed, and the phases of recording mark edges of data areas on which sub information is superimposed are advanced by the above-mentioned minute period of time when the PE modulated random number sequence A7 is 1, whereas they are to be delayed when the PE modulated random number sequence A7 is 0.

The recording channel 307 generates a control signal for changing the recording powers of a laser that is outputted to an optical disc 309 in synchronization with 1/0 in the modulated channel signal A8 from the phase modulator 306, and outputs it to the recording head 308.

The recording head 308 forms, on the optical disc 309, optically-readable modulated recording marks A9 as shown in FIG. 7 by increasing/decreasing the powers of the laser, based on the control signal from the recording channel 307.

Figure 9:
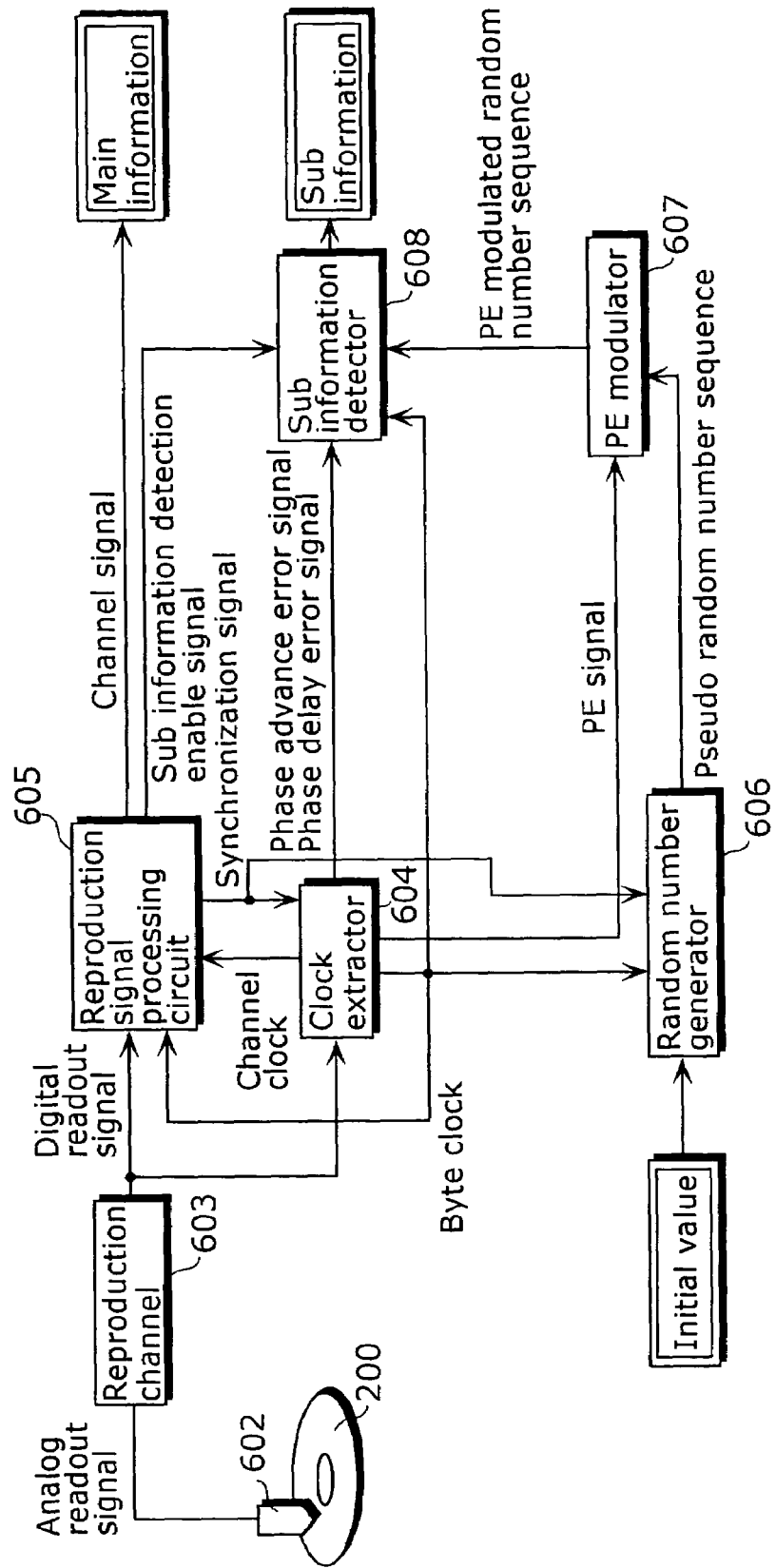
FIG. 9 is a block diagram showing a detailed configuration of a verification/reproduction unit of the optical disc recording apparatus.
Figure 10:
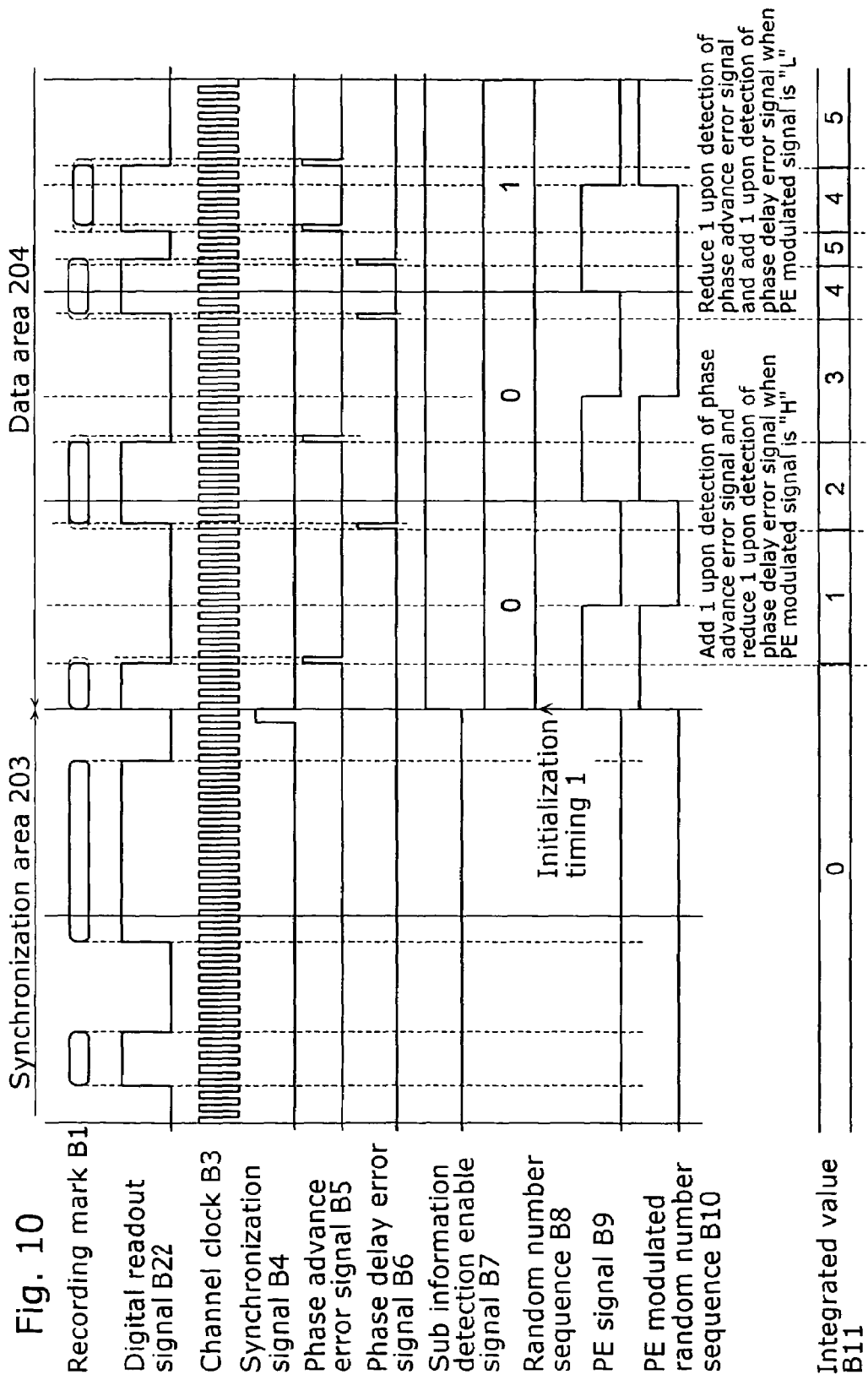
FIG. 10 is a timing chart showing major signals in the verification/reproduction unit.

FIG. 9 is a block diagram showing a detailed configuration of the verification/reproduction unit 13 of the optical disc recording apparatus 1, and FIG. 10 is a timing chart showing major signals used when verification and reproduction is carried out on recorded main information and sub information. The verification/reproduction unit 13 is intended for reproducing main information which has been recorded by the recording unit 12 by forming optically-readable recording marks as well as sub information which has been recorded by the recording unit 12 by displacing the edges of the recording marks by a constant minute amount, and is comprised of a reproduction head 602, a reproduction channel 603, a clock extractor 604, a reproduction signal processing circuit 605, a random number generator 606, a PE modulator 607, and a sub information detector 608.

The reproduction head 602 generates an analog readout signal by converging optical beams so as to radiate them over the recording marks on the rotating optical disc 200 and by amplifying reflected beams received by a photodiode, and outputs such analog readout signal to the reproduction channel 603. The reproduction channel 603 converts the analog readout signal from the reproduction head 602 into a digital readout signal B2 as shown in FIG. 10 by performing waveform equalization and sharpening on such analog readout signal, and outputs the resulting digital readout signal to the clock extractor 604 and the reproduction signal processing circuit 605.

Based on such digital readout signal B2 from the reproduction channel 603, the clock extractor 604 outputs a channel clock B3 synchronized with channel bits, as well as a byte clock synchronized with each recorded data (on a byte-byte-byte basis) in the digital readout signal B2, and outputs them to the reproduction signal processing circuit 605, the random number generator 606, and the sub information detector 608. At the same time, the clock extractor 604 detects a phase error in the readout signal with reference to the channel clock B3, and generates a phase advance error signal B5 when a phase advance is detected, whereas it generates a phase delay error signal B6 when a phase delay is detected, so as to output the generated signal to the sub information detector 608.

Figure 11:
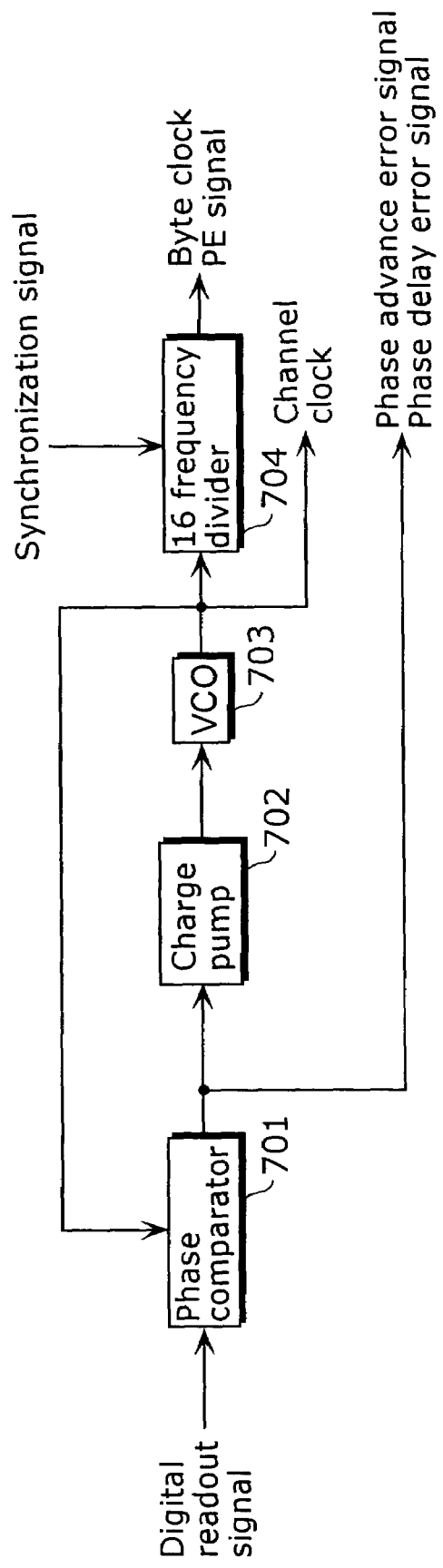
FIG. 11 is a block diagram showing a configuration of a clock extractor of the verification/reproduction unit.

FIG. 11 is a block diagram showing a detailed configuration of the clock extractor 604. The clock extractor 604 is comprised of a PLL circuit made up of a phase comparator 701, a charge pump 702 and a VCO (Voltage Controlled Oscillator) 703, and of a 16 frequency divider 704.

The phase comparator 701 calculates, from the channel clock B3 feed-backed and inputted from the VCO 703 and the digital readout signal B2 from the reproduction channel 603, a phase error between a leading edge/trailing edge in such digital readout signal B2 and a leading edge in the channel clock B3 which is closest to such edge, and outputs the result of the calculation as the phase advance error signal B5 or the phase delay error signal B6 to the charge pump 702.

The charge pump 702 controls output voltage according to the input phase advance error signal B5 and phase delay error signal B6. In other words, output voltage is decreased in order to make the frequency of the channel clock B3 lower when the phase advance error signal B5 is inputted, whereas output voltage is increased in order to make the frequency of the channel clock B3 higher when the phase delay error signal B6 is inputted. The VCO 703 is a voltage controlled oscillator that generates the channel clock B3 at a frequency corresponding to output voltage from the charge pump 702.

The 16 frequency divider 704, which is a counter that divides the frequency of the channel clock B3 from the VCO 703 into 1/16, is reset by a synchronization signal B4 from the reproduction signal processing circuit 605. Subsequently, the 16 frequency divider 704 generates a PE signal B9 and a byte clock synchronized with each recorded data (on a byte-by-byte basis) in the digital readout signal B2, with reference to each synchronization area.

The reproduction signal processing circuit 605 is a circuit for detecting a synchronization area from the digital readout signal B2 inputted by the reproduction channel 603 and demodulating the readout signal with reference to the synchronization area.

Figure 12:
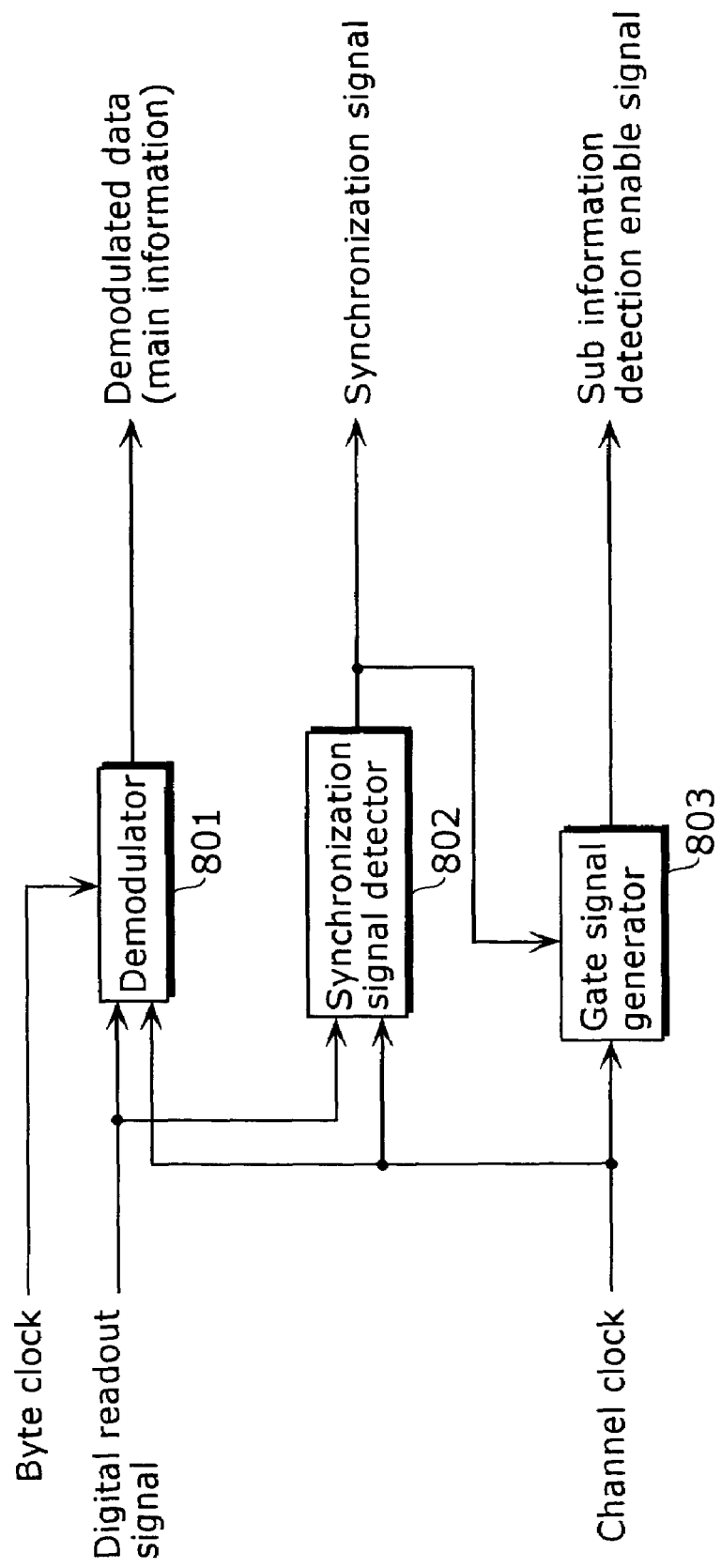
FIG. 12 is a block diagram showing a configuration of a reproduction signal processing circuit of the verification/reproduction unit.

FIG. 12 is a block diagram showing a detailed configuration of the reproduction signal processing circuit 605. The reproduction signal processing circuit 605 is comprised of a synchronization signal detector 802, a demodulator 801, and a gate signal generator 803.

The synchronization signal detector 802 generates a synchronization area (synchronization pattern) included in the digital readout signal B2, and generates the synchronization signal B4 so as to output it to the clock extractor 604 and the random number generator 606.

The demodulator 801, which is a demodulation circuit paired with the modulator 302 of the recording unit 12, samples the digital readout signal B2 inputted by the reproduction channel 603 in synchronization with the channel clock B3 from the clock extractor 604, and converts it into 8-bit recorded data corresponding to a 16-bit channel code in synchronization with the byte clock inputted by the clock extractor 604, and outputs it as main information.

The gate signal generator 803 outputs, to the sub information detector 608, a signal (sub information detection enable signal) B7 indicating the data area in frames (except for the top and the last frames in each sector) on which sub information is recorded, with reference to the synchronization signal B4.

The random number generator 606, which has the same functionality as that of the random number generator 303 of the recording unit 12, presets the initial value at the timing indicated by the synchronization signal B4 from the reproduction signal processing circuit 605, and generates a pseudo random number sequence B8 at the timing indicated by the byte clock from the clock extractor 604.

The PE modulator 607, which has the same functionality as that of the PE modulator 305 of the recording unit 12, performs PE modulation on the pseudo random number sequence B8 outputted from the random number generator according to the PE signal B9 from the clock extractor 604, and outputs the resultant to the sub information detector 608. The sub information detector 608 is a circuit for detecting correlation between the phase advance error signal B5 and the phase delay error signal B6 outputted from the clock extractor 604 and the PE modulated random number sequence (PE modulated signal) from the PE modulator.

Figure 13:
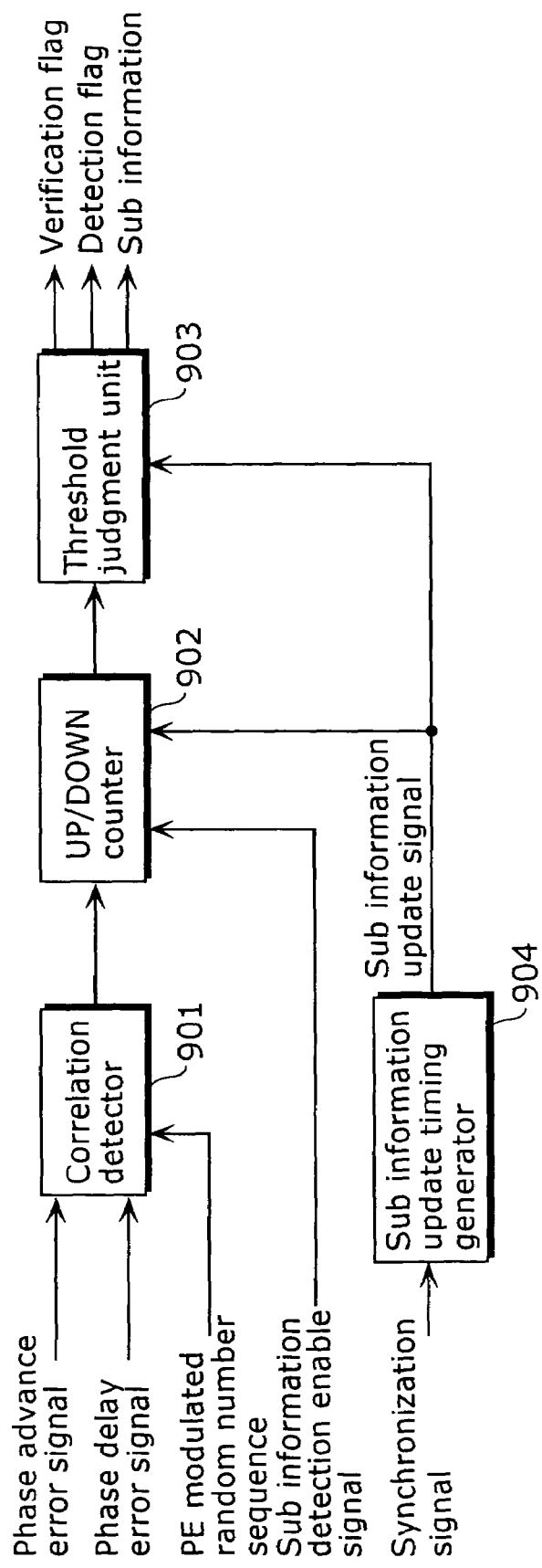
FIG. 13 is a block diagram showing a configuration of a sub information detector of the verification/reproduction unit.

FIG. 13 is a block diagram showing a detailed configuration of the sub information detector 608. The sub information detector 608 is comprised of a correlation detector 901, an UP/DOWN counter 902, a threshold judgment unit 903, and a sub information update timing generator 904.

The correlation detector 901 outputs, to the UP/DOWN counter 902, +1 when the PE modulated random number sequence B10 outputted by the PE modulator 607 is 1 and the phase delay error signal B5 is "H", or when the PE modulated random number sequence B10 is 0 and the phase delay error signal B6 is "H". Meanwhile, the correlation detector 901 outputs, to the UP/DOWN counter 902, −1 when the PE modulated random number sequence B10 is 1 and the phase delay error signal B6 is "H", or when the PE modulated random number sequence B10 is 0 and the phase advance error signal B5 is "H".

The UP/DOWN counter 902 adds an output value (+1 or −1) from the correlation detector 901 when the sub information detection enable signal B7 outputted by the reproduction signal processing circuit 605 is "H" so as to hold the addition result in its internal register, and outputs such addition result to the threshold judgment unit 903. Meanwhile, when the sub information detection enable signal B7 is "L", the UP/DOWN counter 902 does not perform any additions, and holds the value held in the internal register (does not update the value held in the internal register). Furthermore, the UP/DOWN counter 902 clears the integrated value held in its internal register (sets the value held in the internal register to 0) when the sub information update signal is outputted by the sub information timing generator 904.

Therefore, an UP/DOWN counter integrated value B11 increases in the positive direction only when the PE modulated random number sequence B10 is 1 and the phase advance error signal B5 is "H" or when the PE modulated random number sequence B10 is 0 and the phase delay error signal B6 is "H". On the contrary, the UP/DOWN counter integrated value B11 decreases in the negative direction only when the PE modulated random number sequence B10 is 1 and the phase delay error signal B6 is "H" or when the PE modulated random number sequence B10 is 0 and the phase advance error signal B5 is "H". Meanwhile, in the case of areas where no sub information is superimposed, i.e. when neither of the correlations occurs and the phase advance error signal B5 and the phase delay error signal B6 occur randomly, since these error signals occur at an approximately equal rate, the UP/DOWN counter integrated value B11 shall be a value around 0.

The threshold judgment unit 903 includes a register for holding the integrated value B11 outputted by the UP/DOWN counter 902 as well as a comparator and the like for comparing the integrated value B11 it holds with the predetermined positive threshold value for detection, negative threshold value for detection, positive threshold value for verification and negative threshold value for verification. When the sub information update signal is outputted by the sub information update timing generator 904, processing shall be performed as described below.

Figure 14:
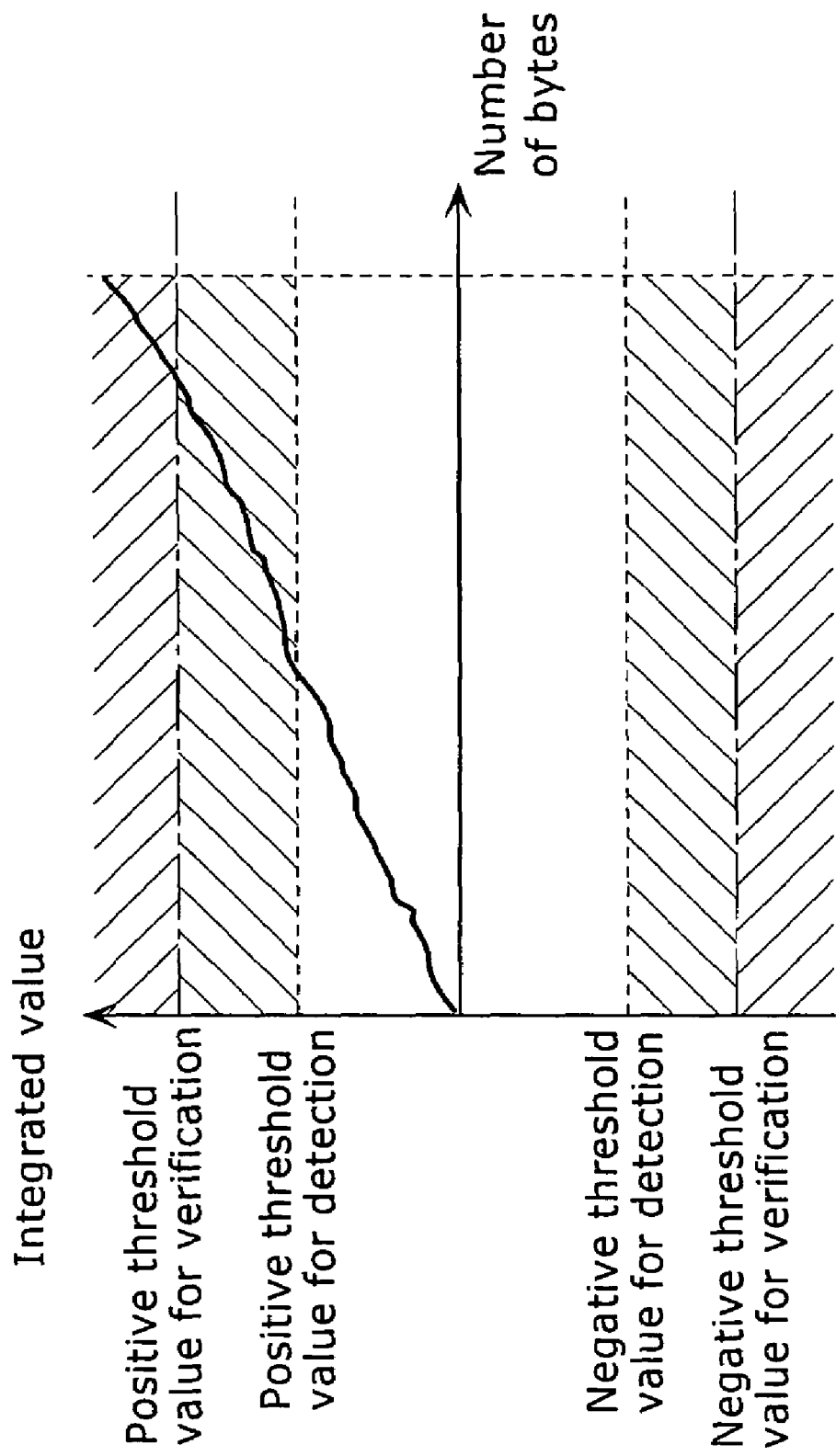
FIG. 14 is an explanation diagram showing an operation of a threshold value judgment unit of the sub information detector.

FIG. 14 is an explanation diagram showing the operation of the threshold value judgment unit 903. The threshold value judgment unit 903 outputs "1" as a sub information sequence when the integrated value B11 held in the internal register is bigger than the positive threshold value for detection at the point of time when the sub information update signal is outputted by the sub information update timing generator 904, whereas it outputs "0" as a sub information sequence when the integrated value B11 is smaller than the negative threshold value for detection and outputs, at the same time, "H" as a detection flag indicating that there existed sub information. Meanwhile, when the integrated value B11 is smaller than the positive threshold value for detection and smaller than the negative threshold value for detection, the threshold value judgment unit 903 outputs "L" as a detection flag, judging that there is no correlation (sub information).

Furthermore, the threshold value judgment unit 903 outputs "H" as a detection flag, judging that sub information is defective, when the integrated value B11 held in the internal register is bigger than the positive threshold value for detection and smaller than the positive threshold value for verification, and when it is smaller than the negative threshold value for detection and bigger than the negative threshold value for verification at the point of time when the sub information update signal is outputted by the sub information update timing generator 904. On the other hand, when the integrated value B11 is bigger than the positive threshold value for verification and smaller than the negative threshold value for verification, the threshold value judgment unit 903 outputs "L" as a detection flag, judging that there is no defect in sub information. Meanwhile, when the integrated value B11 is smaller than the positive threshold value for detection and smaller than the negative threshold value for detection, the threshold value judgment unit 903 outputs "L" as a detection flag, judging that there is no correlation and therefore that there is no defect in sub information.

The sub information update timing generator 904 generates timing to update sub information on the basis of the input synchronization signal B4. The sub information update signal in the present embodiment, which is a signal whose pulse is outputted to the frames excluding the top and the last frames in each sector every three frames, clears the value held in the UP/DOWN counter 902 and updates the judgment result obtained by the threshold value judgment unit 903.

Figure 15:
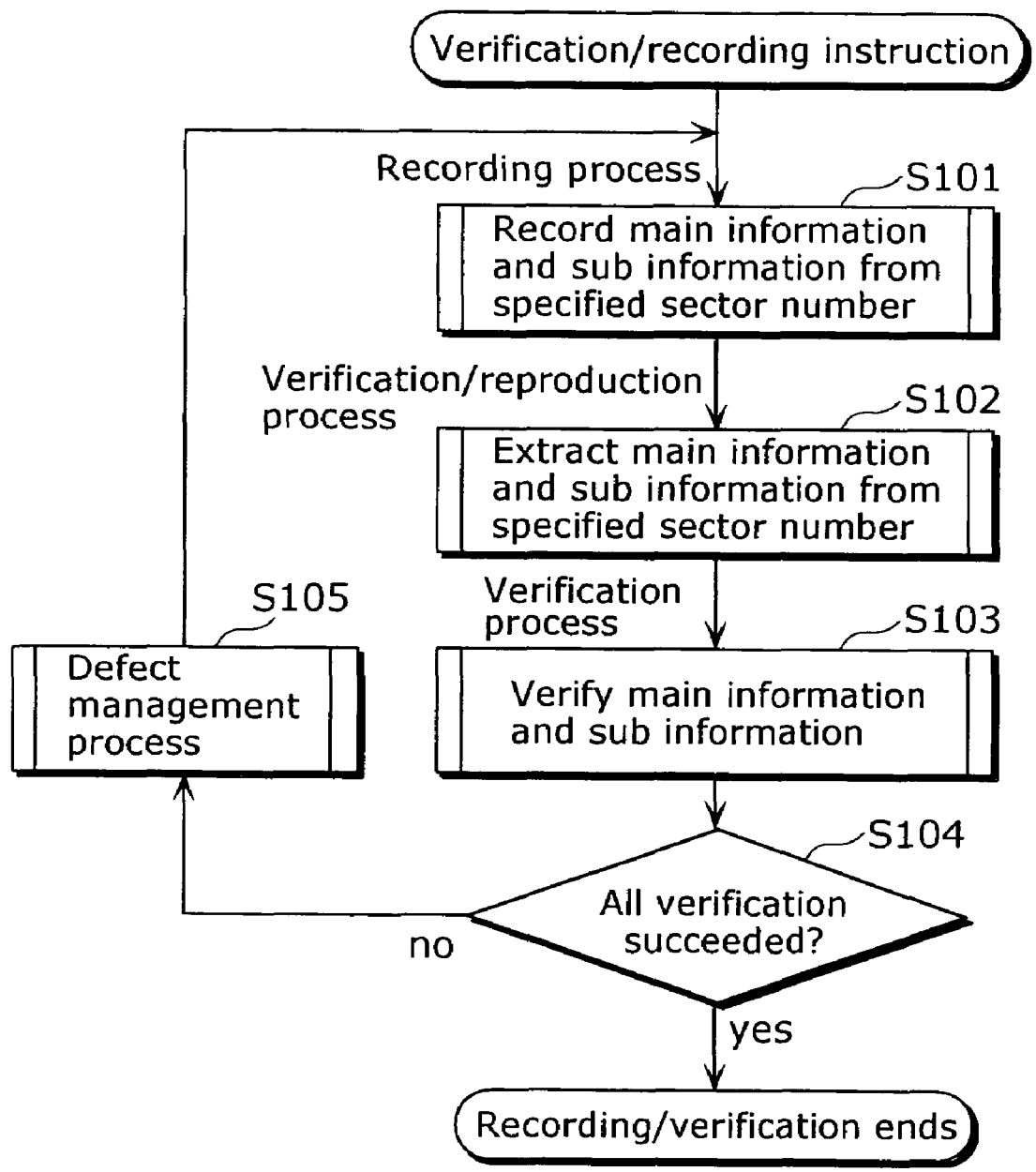
FIG. 15 is a flowchart showing a flow of characteristic processes performed by the optical disc recording apparatus.

Next, an explanation is given of the operation of the optical disc recording apparatus 1 with the above configuration. FIG. 15 is a flowchart showing the flow of characteristic processes performed by the optical disc recording apparatus 1.

The optical disc recording apparatus 1 performs: the recording process for recording main information and sub information in a specified area (Step S101); the verification/reproduction process for reproducing main information to be verified and sub information to be verified from the above specified area (Step S102); the verification process for verifying whether the area where the recording process has been performed can be reproduced in a stable manner or not, on the basis of the reproduced main information and sub information to be verified (Steps S103 and S104); and the defect management process for conducting defect management of the above area as a defective area when it is judged in the verification process that such area is unable to be reproduced in a stable manner, and relocating the main information and the sub information to an area in which recording can be performed in a stable manner (Step S105).

In the recording process S101, the system control unit 14 memorizes main information and sub information to be recorded that are equivalent to 16 sectors (an ECC block unit), and instructs the recording unit 12 to perform recording.

In the recording unit 12, when the timing generator 301 outputs "H" to the synchronization signal A3, the modulator 302 generates a channel signal (synchronization pattern) which constitutes the synchronization area 501 of each frame. When the synchronization signal A3 is "L", the modulator 302 modulates main information to be recorded (8-16 modulation for DVDs), and outputs it as a channel signal. The timing signal generator 301 outputs "L" to the synchronization signal A3 according to the data area 502 in a frame where sub information is to be recorded, and outputs, at the same time, the phase modulation enable signal A4 to the phase modulator 306.

The random number generator 303 initializes the random number sequence when the synchronization signal A3 is "H", whereas it generates the pseudo random number sequence A5 bit by bit in synchronization with the byte clock when the synchronization signal A3 is "L". The random number sequence converter 304 carries out exclusive OR between such pseudo random number sequence A5 and sub information to be recorded, and generates a sub information correlation sequence (it will be the same as the pseudo random number sequence A5 when sub information to be recorded is "0", whereas it will be the result of inverting the pseudo random number sequence A5 when sub information to be recorded is "1"). An example shown in FIG. 7 illustrates the case where sub information to be recorded is 0 and where the sub information correlation sequence and the pseudo random number sequence A5 are the same. Moreover, the PE modulator 305 performs PE modulation on the sub information correlation sequence (which is the same as the pseudo random number sequence A5, here) on the basis of the PE signal A6 from the timing generator 301, and obtains the PE modulated random number sequence A7.

The phase modulator 306 outputs the channel signal A2 as it is as the modulated channel signal A8 when the phase modulation enable signal A4 is "L", whereas it advances or delays the phase of an edge of the channel signal A2 depending on the value of the PE modulated random number sequence A7, when the phase modulation enable signal A4 is "H". Here, processing is performed for advancing the edge of the channel signal by $\Delta t$ when the PE modulated random number sequence A7 is "1", whereas processing is performed for delaying the edge of the channel signal by $\Delta t$ when the PE modulated random number sequence A7 is "0". Modulated recording marks A9 can be formed on an optical disc by controlling the laser by use of the modulated channel signal A8 generated in the above manner.

As described above, the recording unit 12 not only records main information, but also superimposes and records sub information (in the present embodiment, 128 bits per ECC block) by performing phase modulation on the recording mark edges of the main information by a constant minute amount.

Next, in the verification/reproduction process S102, when the recording processing ends, the system control unit 14 instructs the verification/reproduction unit 13 to perform verification/reproduction of recorded main information and sub information that are equivalent to 16 sectors (an ECC block unit).

In the verification/reproduction unit 13, when the digital readout signal B2 is inputted, the clock extractor 604 generates the channel clock B3 resulted by synchronizing both of its edges with the phase of leading edges of the channel clock B3. The reproduction signal processing circuit 605 searches for a synchronization area in the data by sampling the digital readout signal B2 at the timing indicated by trailing edges of the channel clock B3 and making a comparison to see if they match a specified synchronization pattern. On the detection of a pattern that matches the synchronization pattern, the reproduction signal processing circuit 605 outputs the synchronization signal B4 from the synchronization signal detector 802, and outputs the sub information detection enable signal B7 from the gate signal generator 803 according to the data area of frames (except for the top and the last frames in each sector) in which sub information is superimposed.

When the synchronization signal B4 is outputted, the clock extractor 604 clears the internal 16 frequency divider, and outputs the byte clock that is resulted by dividing the frequency of the channel clock B3 into $\frac{1}{16}$ as well as the PE signal B9. Also, when the synchronization signal B4 is outputted, the random number generator 606 initializes the random number sequence (an initial value is set in the internal register at the timing indicated by an initialization timing 1), and outputs the pseudo random number sequence B8 bit by bit at the timing indicated by the byte clock (every 16 channel clocks). From such pseudo random number sequence B8 and the PE signal B9, the PE modulator 607 generates the PE modulated random number sequence B10 in which the respective 8 channel clocks out of 16 channel clocks form an interval of 1 and an interval of 0.

The clock extractor 604 detects a phase error between a leading edge of the channel clock B3 and an each of edges of the digital readout signal B2, and outputs the phase advance error signal B5 when an edge of the digital readout signal B2 advances further than a leading edge of the channel clock B3, whereas it outputs the phase delay error signal B6 when an edge of the digital readout signal B2 is behind a leading edge of the channel clock B3.

The sub information detector 608 adds the phase advance error signal B5 and subtracts the phase delay error signal B6 during an interval in which the PE modulated random number sequence B10 is 1, when the sub information detection enable signal B7 is "H". The sub information detector 608 adds the phase delay error signal B6 and subtracts the phase advance error signal B5 during an interval in which the PE modulated random number sequence B10 is 0. In an example shown in FIG. 10, since the phase advance error signal B5 is outputted during an interval in which the PE modulated random number sequence B10 is 1 and the phase delay error signal B6 is outputted during an interval in which the PE modulated random number sequence B10 is 0, the integrated value determined by the UP/DOWN counter 902 of the sub information detector 608 increases.

Accordingly, at the point of time when integrations for a predetermined number of frames are finished (3 frames in the present embodiment) (at the time when sub information update signal is outputted), "1" is detected as sub information (a detection flag "1" is outputted at the same time) when the integrated value determined by the UP/DOWN counter 902 is bigger than the positive threshold value for detection, "0" is detected as sub information (a detection flag "1" is outputted at the same time) when the integrated value is smaller than the negative threshold value for detection, and a detection flag "0" is outputted when the integrated value is in between a negative correlation threshold value and a positive correlation threshold value.

Next, in the verification process S103, a judgment is made on whether or not main information and sub information recorded on the optical disc can be read out in a stable manner. To put it another way, a verification is performed to see if areas in which the recording process has been performed can be read out in a stable manner, on the basis of sub information readout on an ECC block basis (128 bits) and main information outputted by the reproduction signal processing circuit 605 in the verification/reproduction processing S102.

Figure 16:
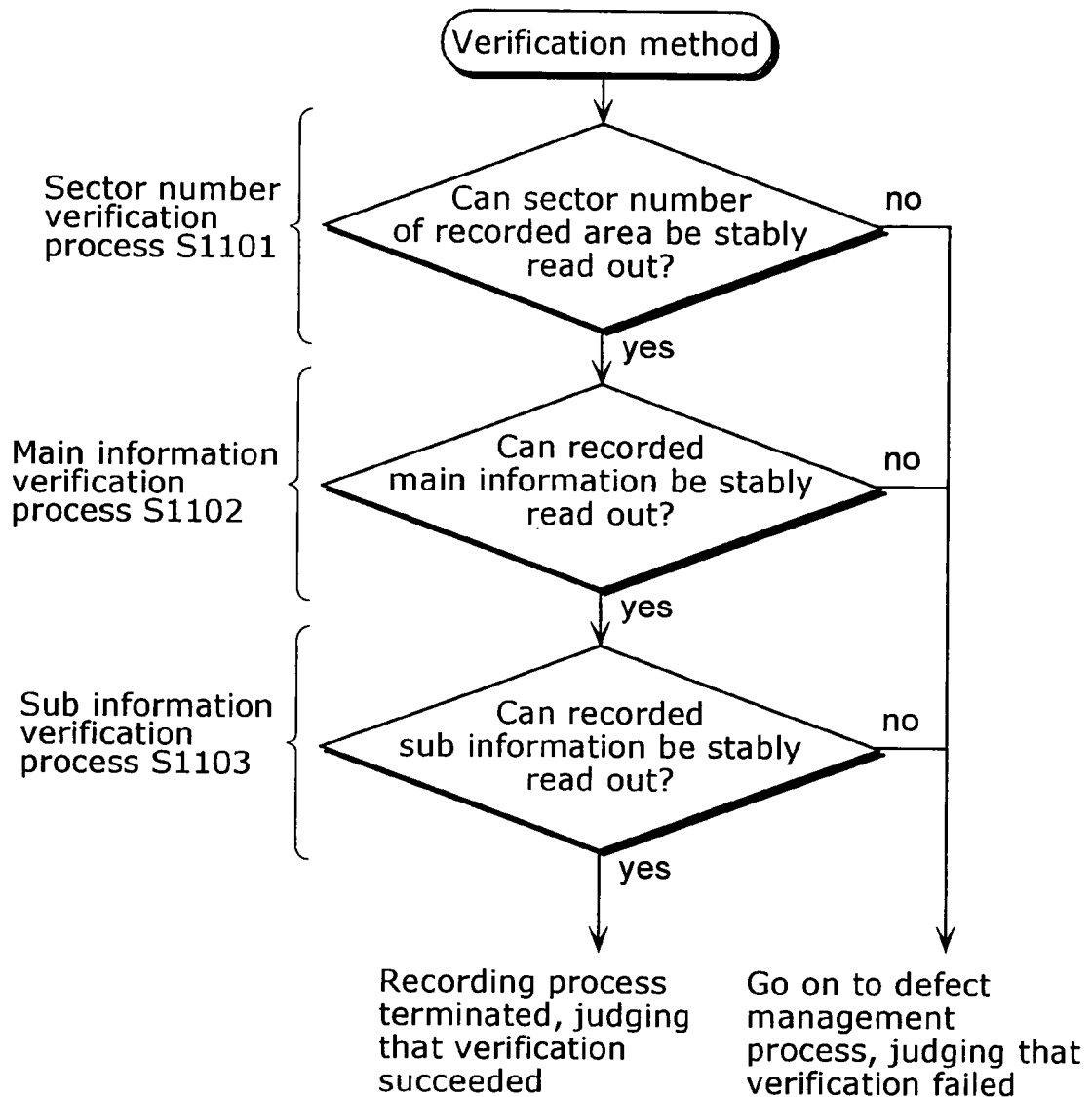
FIG. 16 is a flowchart showing a flow of a verification process performed by the optical disc recording apparatus.
Figure 17:
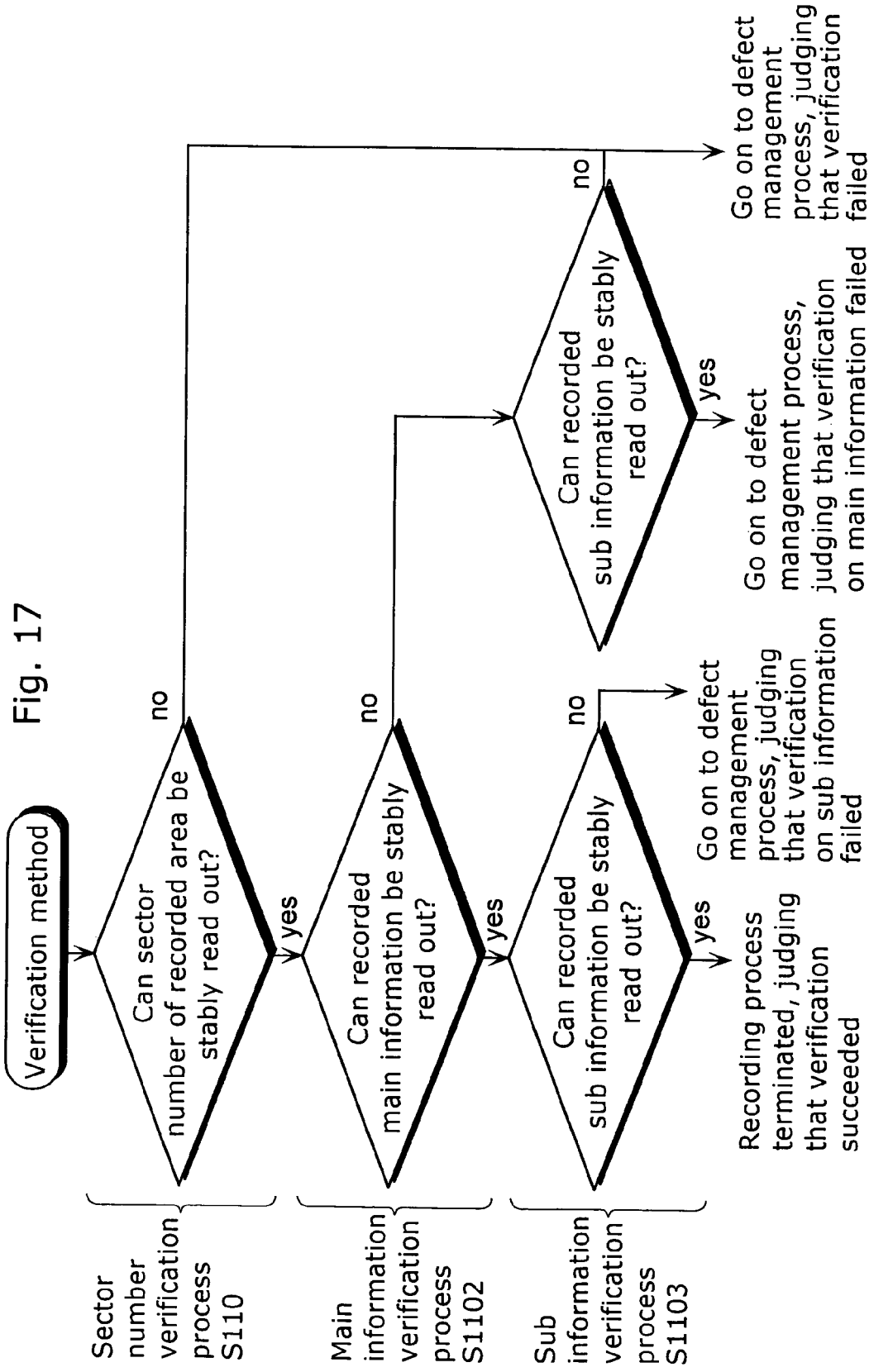
FIG. 17 is a flowchart showing another processing method of the verification process performed by the optical disc recording apparatus.

FIG. 16 is a flowchart showing the flow of such verification process. The system control unit 14 of the optical disc recording apparatus 1 performs: the sector number verification process for verifying whether a sector number in which main information superimposed with sub information can be read out in a stable manner or not (Step S1101); the main information verification process for verifying whether recorded main information can be read out in a stable manner or not (Step S1102); and the sub information verification process for verifying whether sub information superimposed on such main information can be read out in a stable manner or not (Step S1103). Note that FIG. 17 is a flowchart which shows the flow of another processing method of this verification process and which shows the flow in the case where the relocation process is performed using Method B in a detection management process S104 to be described later. Here, the sub information verification process S1103 is carried out even when it is judged, in the main information verification process S1102, that main information cannot be read out in a stable manner.

In the sector number verification process S1101, the system control unit 14 performs a verification to see if one or more sector numbers physically embedded in the optical disc can be reliably readout or not. In a DVD-RAM, for example, there are four areas called CAPAs at the top of a sector in which the sector number is embedded, and a threshold value which enables at least one of these to be read out under any conditions is set and verified. When a sector number readout errors equivalent to a value equal to or bigger than such threshold value occur, the defect management process shall be performed on such physical sector as a defective area. If the verification succeeds, the main information verification process is then carried out for checking the reliability of reading out the main information.

In the main information verification process S1102, the system control unit 14 compares real main information recorded by the recording operation with the main information to be verified that is extracted at the time of verification/reproduction, so as to determine how many bytes of errors are detected. Next, the system control unit 14 judges whether or not the determined number of byes of error detections is over a threshold value that has been set in advance on the basis of the number of error-correctable bytes included in an ECC block in order that main information can be read out in a stable manner even under a certain degree of adverse conditions. If the result of such judgment is that there exist error detections over the threshold value, the defect management process shall be performed on an area including such sector as a defective area related to main information. Also, since it is impossible to carry out an error correction when an error correction is detected by an error correcting and detecting code within an ECC block, the defect management process shall also be performed on an area including such sector as a defective area related to main information. When the verification of the main information succeeds, the sub information verification process S1103 is then performed.

Any of the following three methods shall be used as the sub information verification process S1103.

(Method 1)

The system control unit 14 performs a verification to see if sub information can be read out in a stable manner or not, on the basis of a verification flag outputted by the threshold value judgment unit 903 of the sub information detector 608. To put it another way, the system control unit 14 counts the number of bits where the verification flag was "H" out of the whole sub information sequence (128 bits in the present embodiment), and judges whether such number of bits is over a predetermined threshold value or not. If the result of such judgment is that the counted number of bits exceeds the threshed value, the defect management process shall be performed as a defective area related to the sub information. Meanwhile, when the counted number of bits does no exceed the threshold value, i.e. when the sub information verification succeeds, the verification/reproduction process is terminated, with sector numbers, main information and sub information being regarded as reproducible in a stable manner.

(Method 2)

The system control unit 14, through the threshold value judgment unit 903 of the sub information detector 608, determines how many bytes of errors are detected, by making a bit comparison between (i) a sub information sequence to be verified extracted on the basis of the correlation value (integrated value) integrated in the UP/DOWN counter 902 and the predetermined positive threshold value for detection/negative threshold value for detection and (ii) the real sub information recorded at the time of the recording operation.

Figures 18, 19:
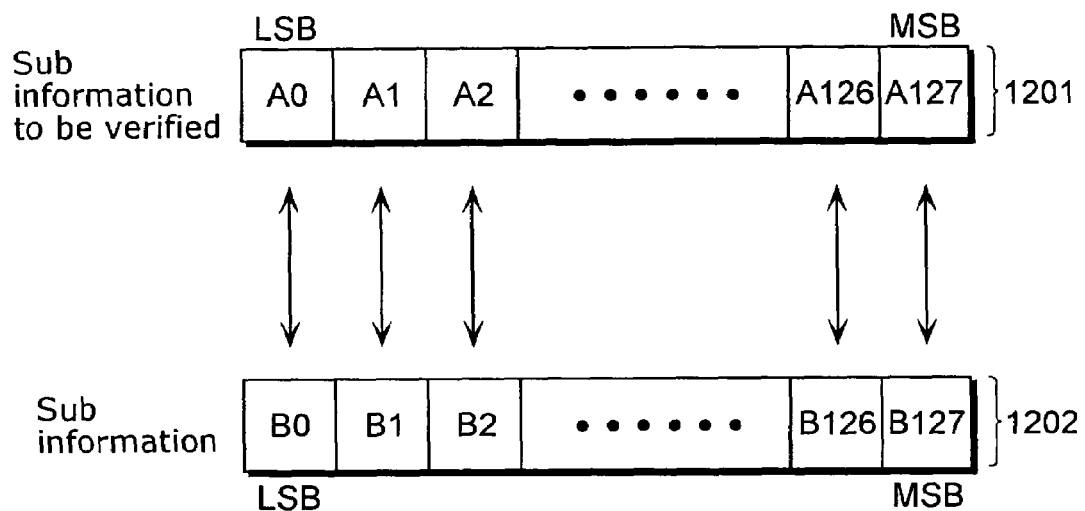
FIG. 18 is a conceptual diagram showing a sub information verification process in the verification process.
FIG. 19 is an explanation diagram showing a case-by-case relocation process to be performed depending on a reason why an area is judged to be defective.

FIG. 18 is a conceptual diagram showing this sub information verification process. Comparison and verification is made on sub information to be verified 1201 and sub information 1202 on a bit-by-bit basis in order to verify if the sub information can be read out in a stable manner or not by making a comparison between (i) the number of bits out of the whole sequence (128 bits in the present embodiment) which do not match, i.e. the number of bits where errors are detected in the sub information and (ii) a predetermined threshold value A.

The threshold value A is set to a value equal to or smaller than the number of correctable bits to be determined depending on parity code included in sub information itself. In the present embodiment, the breakdown of sub information to be recorded in each ECC block is assumed to be: 64-bit confidential information; a 48-bit error correcting code; and a 16-bit error correcting and detecting code. In this case, even if errors of up to 6 bits are detected out of 128 bits, it is possible to extract sub information in a stable manner by correcting such an error-detected bit. Because of this reason, a value serving as the threshold value A shall be 6 or smaller in the present embodiment. When the number of error-detected bits in sub information exceeds such threshold value A, the defect management process is conducted as a defective area related to the sub information. Similarly, when it is recognized that an error correction has been conducted by the error correcting and detecting code of sub information, the defect management process shall also be performed as a defective area related to sub information. When the verification of the main information succeeds, the verification/reproduction process is terminated, with sector numbers, main information and sub information being regarded as reproducible in a stable manner.

(Method 3)

The system control unit 14 verifies if sub information can be read out in a stable manner or not by comparing, with the predetermined threshold value A, the number of errors detected by performing an error correction by use of the parity code included in the sub information itself. When the number of error detected bits at the time of the error correction has proven to exceed such threshold value A, the defect management process shall be performed as a defective area related to sub information. When the number of error detected bits does not exceed the threshold value, i.e. when the verification of the sub information succeeds, the verification/reproduction process is terminated, with sector numbers, main information and sub information being regarded as reproducible in a stable manner.

Note that although the defect management process is immediately carried out when an area where information is recorded has been judged to be a defective area in any one of the sector number verification process, the main information verification process and the sub information verification process, the retry process may be carried out instead for trying to record the same main information and sub information again in the same area.

As described above, the defect management process S104 shall be performed when an area where sector numbers, main information and sub information are recorded is judged to be a defective area in the sector number verification process, the main information verification process, and the sub information verification process of the verification process S103. In the present embodiment, the defect management is conducted in accordance with the linear replacement algorithm that is one of the defect management processes intended for DVD-RAMs.

In the linear replacement algorithm, when a defective area is found at the time of verifying the recorded information, it is relocated to a spare area which is provided in advance within an optical disc user area. Then, the respective top sector numbers of such defective area and its corresponding replacement area are registered and managed, as an entry pair, on a defect management list (SDL) which exists in a lead-in area and a lead-out area of an optical disc. The above defective area and replacement area are provided for each ECC block (16 sectors) and relocation processing is performed on them on an ECC block basis.

FIG. 19 is an explanation diagram showing a case-by-case relocation process to be performed depending on a reason why an area is judged to be defective. The following explains Method A for relocating, into a replacement area, main information and sub information to be recorded in a defective area when such defective area is judged to be defective in either the main information verification process or the sub information verification process as shown in FIG. 16, as well as Method B for performing relocation process depending on whether an area is judged to be defective in the main information verification process or in the sub information verification process as shown in FIG. 17.

(Method A)

Figure 20:
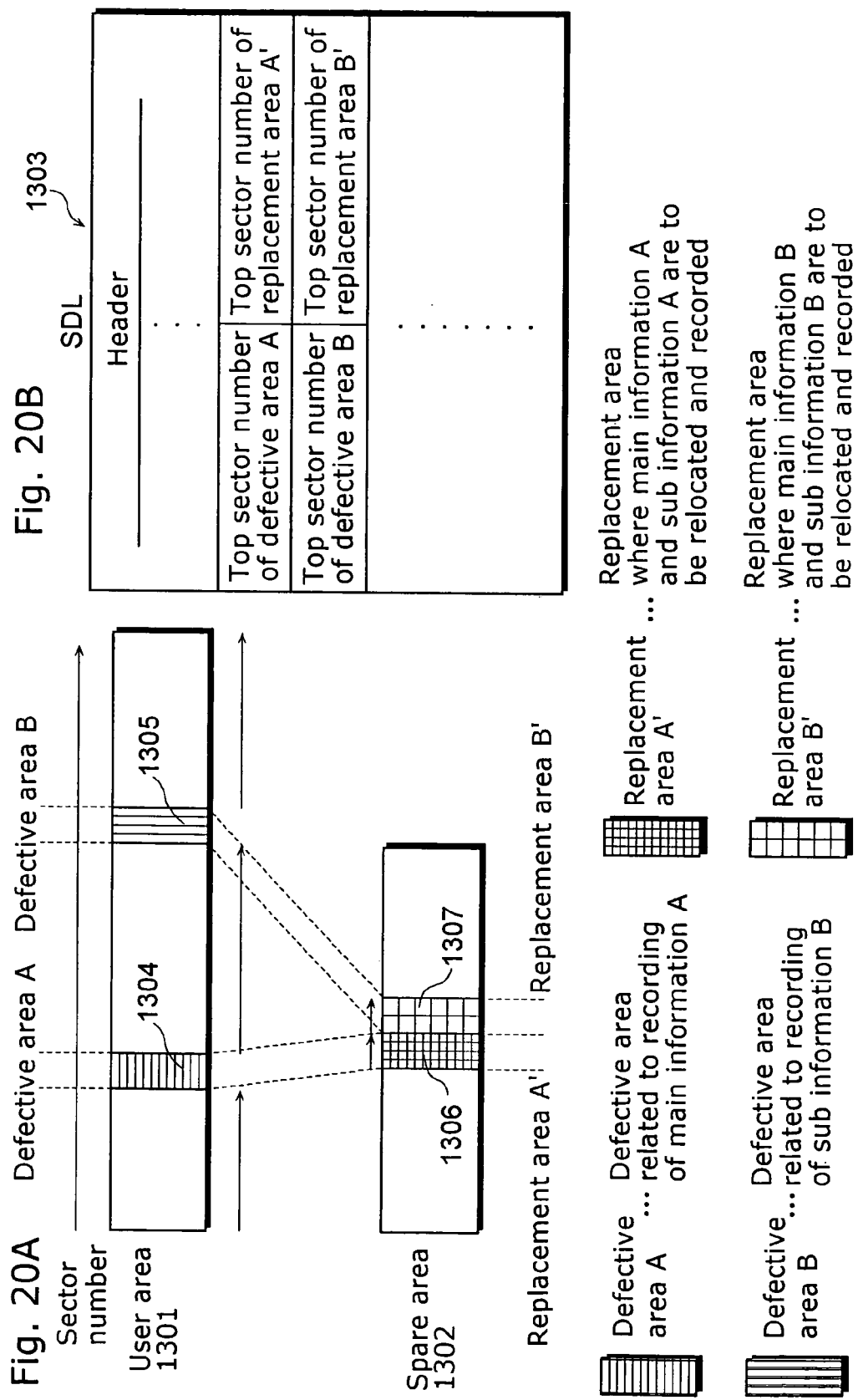
FIG. 20 is a conceptual diagram showing linear replacement algorithm in Method A used in a defect management process performed by the optical disc recording apparatus.

FIG. 20 is a conceptual diagram showing the linear replacement algorithm in Method A. As shown in FIG. 20A, inside an optical disc are: a user area 1301 in which main information is stored by forming optically-readable recording marks and in which sub information is stored by displacing their recording mark edges by a constant minute amount; a spare area 1302 to which relocation is performed when the user area 1301 is a defective area; and, as shown in FIG. 20B, a secondary defect list (SDL) 1303 for managing the respective top sector numbers of a defective area and a replacement area as an entry pair when such defective area is relocated to the replacement area (which is inside the spare area 1302).

Here, assume that a defective area A1304 is an area in which main information A and sub informiation A are stored and which is judged to be a defective area in the verification process carried out forte main information A, and tat a defective area B 1305 is an area in which main information B and sub information B are stored and which is judged to be a defective area in the verification process carried out for the sub information B.

Figure 21:
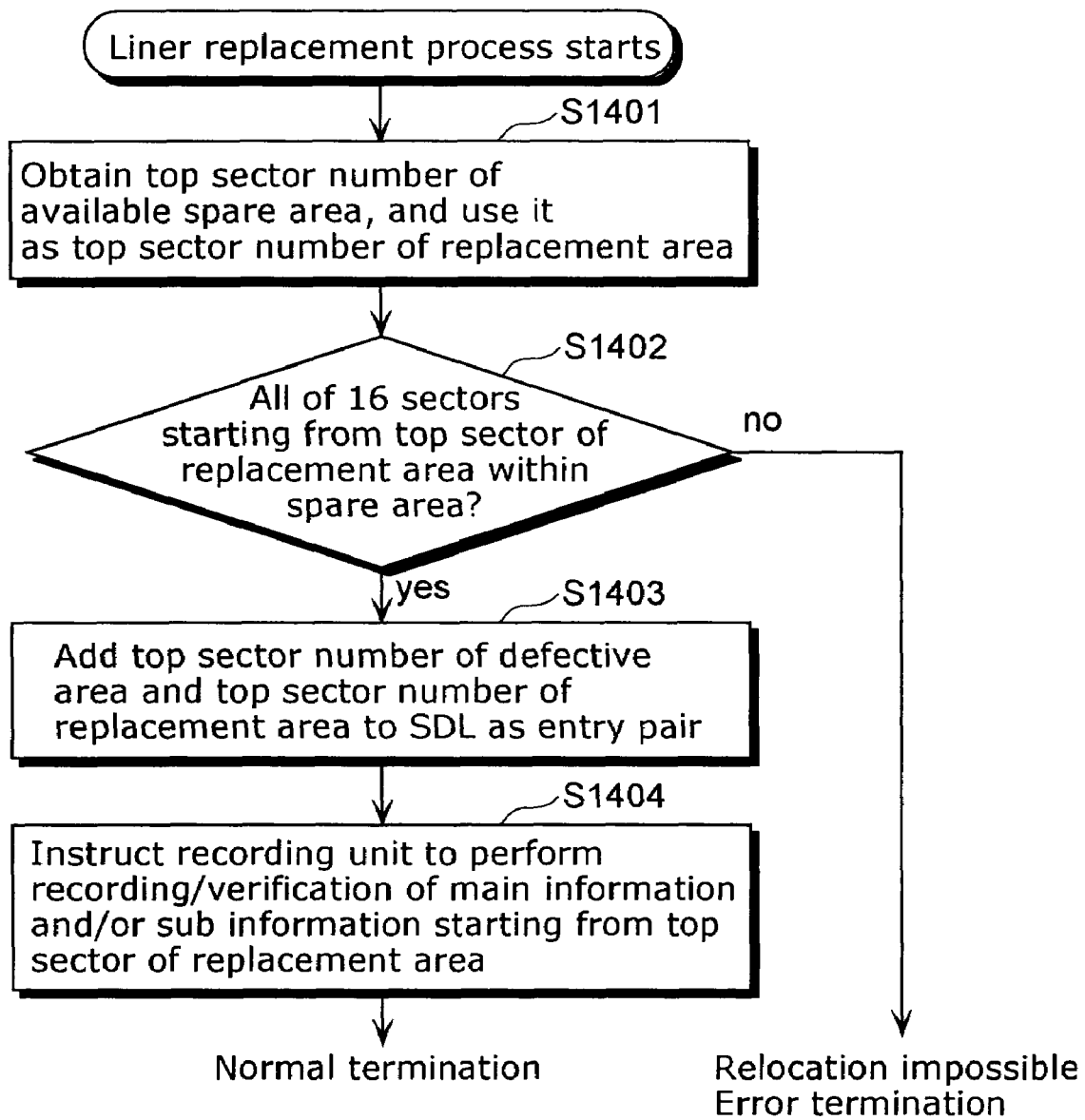
FIG. 21 is a flowchart showing a procedure of a linear replacement process in the defect management process performed by the optical disc recording apparatus.

FIG. 21 is a flowchart showing the procedure of the linear replacement process according to the present embodiment. When an area is judged to be defective in the main information verification process as in the case of the defective area A1304, for example, the system control unit 14 searches the spare area 1302 for an available area, and obtains the sector number of the top sector in such available area (Step S1401). Since the relocation process is carried out on an ECC block (16 sectors) basis as described above, the system control unit 14 judges whether all 16 sectors required for relocation are within the spare area 1302 or not, starting from the top sector of the available area (Step S1402). When the result of the judgment is that a sector which is not within the spare area 1302 is included, an error termination shall be applied. When all the 16 sectors are within the spare area 1302, on the other hand, it means that an area to which relocation can be performed has been reserved. Such reserved area shall be treated as a replacement area A'1306 corresponding to the defective area A1304, and the obtained top sector number is treated as the top sector number of such replacement area A'1306. The system control unit 14 adds the respective top addresses of the defective area A1304 and the replacement area A'1306 to the SDL 1303 as an entry (Step S1403). Finally, the system control unit 14 instructs the recording unit 12 to relocate and record the main information A and the sub information A, which were supposed to be recorded in the defective area A1304, starting from the top sector of the replacement area A'1306 (Step S1404), and terminates the process.

Next, when an area is judged to be defective in the sub information verification process as in the case of the defective area B1305, for example, the system control unit 14 obtains an available area from the spare area 1302 as in the case of the defective area A1304, and treats it as a replacement area B'1307. Then, the system control unit 14 adds the respective top addresses of the defective area B1305 and the replacement area B'1307 to the SDL 1303 as an entry. Finally, the system control unit 14 instructs the recording unit 12 to relocate and record the main information B and the sub information B, which are equivalent to an ECC block and which were supposed to be recorded in the defective area B1305, into the 16 sectors that begin with the top sector number of the replacement area B'1305, and terminates the process.

(Method B)

Figure 22:
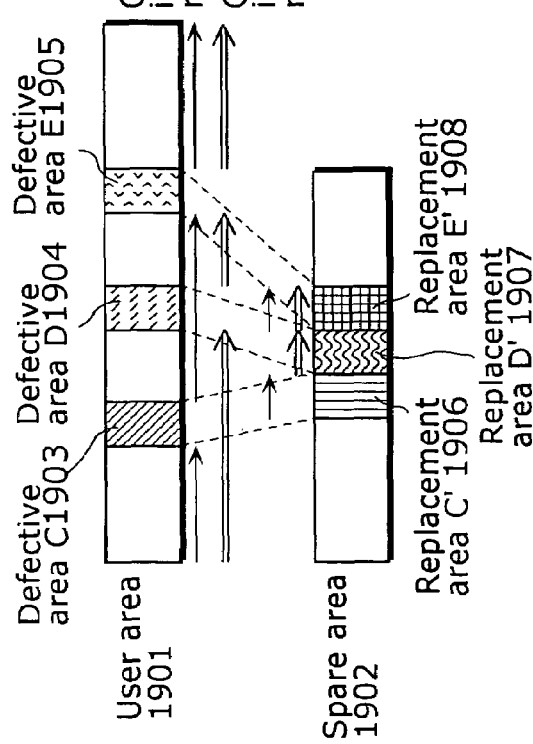
FIG. 22 is a conceptual diagram showing linear replacement algorithm in Method B used in the defect management process performed by the optical disc recording apparatus.

FIG. 22 is a conceptual diagram showing the linear replacement algorithm in Method B. As shown in FIG. 22A, inside an optical disc are: a user area 1901 and a spare area 1902, and as shown in FIG. 22B, a secondary defect list (SDL) 1909 for managing information concerning the time when defective areas are relocated to the respective replacement areas (which are inside the spare area 1902), as in the case shown in FIG. 20. In the SDL 1909, the following are managed in association with one another: a defective area list 1910 indicating the top sector numbers of the respective defective areas; a replacement area list 1911 indicating the top sector numbers of the respective replacement areas (which are inside the spare area 1902) corresponding to the above defective areas; a main information defect flag 1912 indicating whether or not each of the defective areas is judged to be defective in the main information verification process; and a sub information defect flag 1913 indicating whether or not each of the defective areas is judged to be defective in the sub information verification process.

Here, assume that a defective area C1903 is an area in which main information C and sub information C are stored and which is judged to be a defective area only in the verification process carried out for the main information C, that a defective area D 1904 is an area in which main informality D and sub information D are stored and which is judged to be a defective area only in the verification process carried out for the sub information D, and that a defective area E1905 is an area in which main information E and sub information E are stored and which is judged to be a defective area in the verification processes carried out for the main information E and the sub information E.

For example, when an area is judged to be defective only in the verification process for the main information C as in the case of the defective area C1903, the system control unit 14 obtains a replacement area as in the case of Method A, and relocates and records only the main information C in a replacement area C'1906. When this is done, in the SDL 1909, the respective top sector numbers of the defective area C1903 and the replacement area C'1906 are set, as well as "1" is set as the main information defect flag 1912 and "0" is set as the sub information defect flag 1913.

Meanwhile, when an area is judged to be defective only in the verification process for the sub information D as in the case of the defective area D1904, the system control unit 14 obtains a replacement area as in the case of Method A, and relocates and records only the sub information D in a replacement area D'1907. When this is done, in the SDL 1909, the respective top sector numbers of the defective area D1904 and the replacement area D'1907 are set, as well as "0" is set as to the main information defect flag 1912 and "1" is set as the sub information defect flag 1913. Note that dummy information may simply be recorded as main information, when only the sub information D is relocated and recorded in the replacement area D'1907.

Also, when an area is judged to be defective in the verification processes for both the main information E and the sub information E as in the case of the defective area E1905, the system control unit 14 obtains a replacement area as in the case of Method A, and relocates and records the main information E and the sub information E in a replacement area E'1908. When this is done, in the SDL 1909, the respective top sector numbers of the defective area E1905 and the replacement area E'1908 are set, as well as "1" is set as the main information defect flag 1912 and "1" is set as the sub information defect flag 1913.

As described above, the same main information and sub information are relocated and recorded again in a replacement area, when such main information and sub information are judged, in the respective verification processes, that they cannot be read out in a stable manner. Accordingly, it is possible to circumvent the phenomenon in which, when a decryption key for an encrypted content is recorded as sub information, for example, the encrypted content which is main information is recorded but the decryption key for decrypting such encrypted content fails to be recorded.

Moreover, it is possible to record sub information in the same area as the one where main information is recorded in a stable manner, even in the case where copying management information for managing the transfer or copying of contents between recording media, is recorded as sub information. Accordingly, it is possible to update, in a stable manner, copying management information indicating the number of times for which transfer is allowed between recording media and the number of times for which copying is allowed between recording media, and the like.

Generally, once-recorded information shall not be deleted even when an area storing such information is judged to be a defective area, but information in a once-recorded defective area may be deleted in the case where a decryption key for content encryption and confidential information such as copying management information are recorded as sub information.

Also, when video information is recorded as main information and its corresponding audio information is recorded as sub information, it is possible to prevent information from becoming audio-only information or video-only information.

Furthermore, when a defective area is judged in the verification process that only its main information cannot be read out in a stable manner and therefore only such main information is relocated and recorded with sub information being left in such defective area, it becomes possible to make an efficient use of a limited space of the recording area on an optical disc, since the sub information, which has been recorded in a recording method different from a recording method used for the main information, can be recorded in the main information-related defective area, in which information cannot be recorded by an existing technique.

Accordingly, even when there exists a defective area related to the recording of the main information or the sub information, or both the main information and the sub information due to dust, scar, finger print and other factors on an optical disc, since the main information or the sub information, or both the main information and the sub information is/are relocated and recorded in a replacement area, it is possible to create an optical disc from which main information and sub information can be read out in a stable manner.

Figure 23:
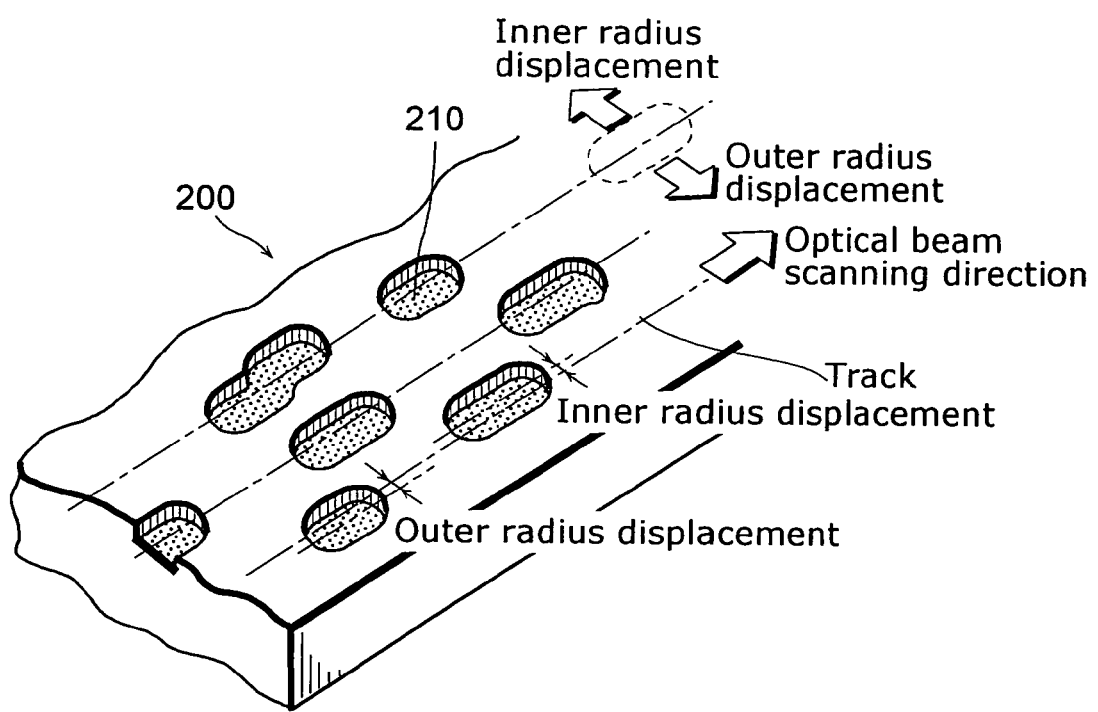
FIG. 23 is an external view showing a surface of an optical disc on which sub information is recorded using another superimposition method.

Note that although the optical disc defect management method has been explained in the present embodiment by taking an example case where sub information is recorded by means of phase modulation for changing the position of standard edges of recording marks that constitute main information by a minute amount in the moving direction of track, the present invention is not limited to this. As shown in FIG. 23, for example, the present invention is also applicable to the case where sub information is recorded by means of phase modulation for changing the standard position of recording marks 210 that constitute main information on the optical disc 200 by a minute amount in the direction intersecting the moving direction of track. Furthermore, the present invention is also applicable to the case where a modulation rule and the like is employed in which sub information is recorded by triggering bit errors by acting against the rules that are determined depending on the type of an optical disc.

(Optical Disc Reproduction Apparatus)

Figure 24:
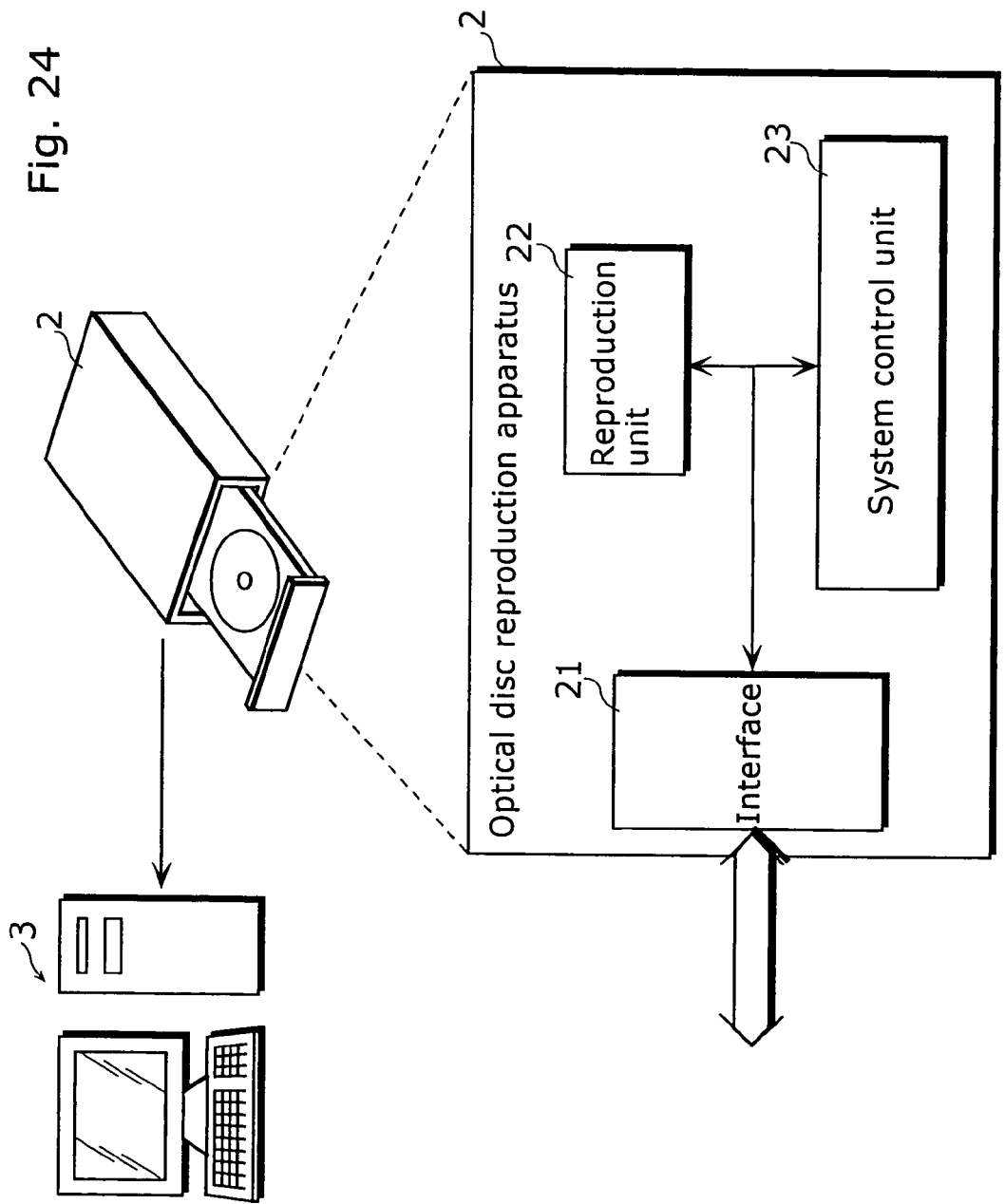
FIG. 24 is a block diagram showing a configuration of a preferred embodiment of an optical disc reproduction apparatus according to the present invention.

FIG. 24 is an explanation diagram showing the configuration of an embodiment of the optical disc reproduction apparatus according to the present invention. An optical disc reproduction apparatus 2 is an apparatus for reproducing main information and sub information from an optical disc which have been recorded by the optical disc recording apparatus 1. As shown in FIG. 24, this optical disc reproduction apparatus 2 is used being connected to or incorporated into an apparatus 3 such as a personal computer, and is comprised of an interface 21, a reproduction unit 22, and a system control unit 23. Note that an explanation of the reproduction unit 22 is omitted here since it has an equivalent functionality/configuration as that of the verification/reproduction unit 13 of the optical disc recording apparatus 1.

Figure 25:
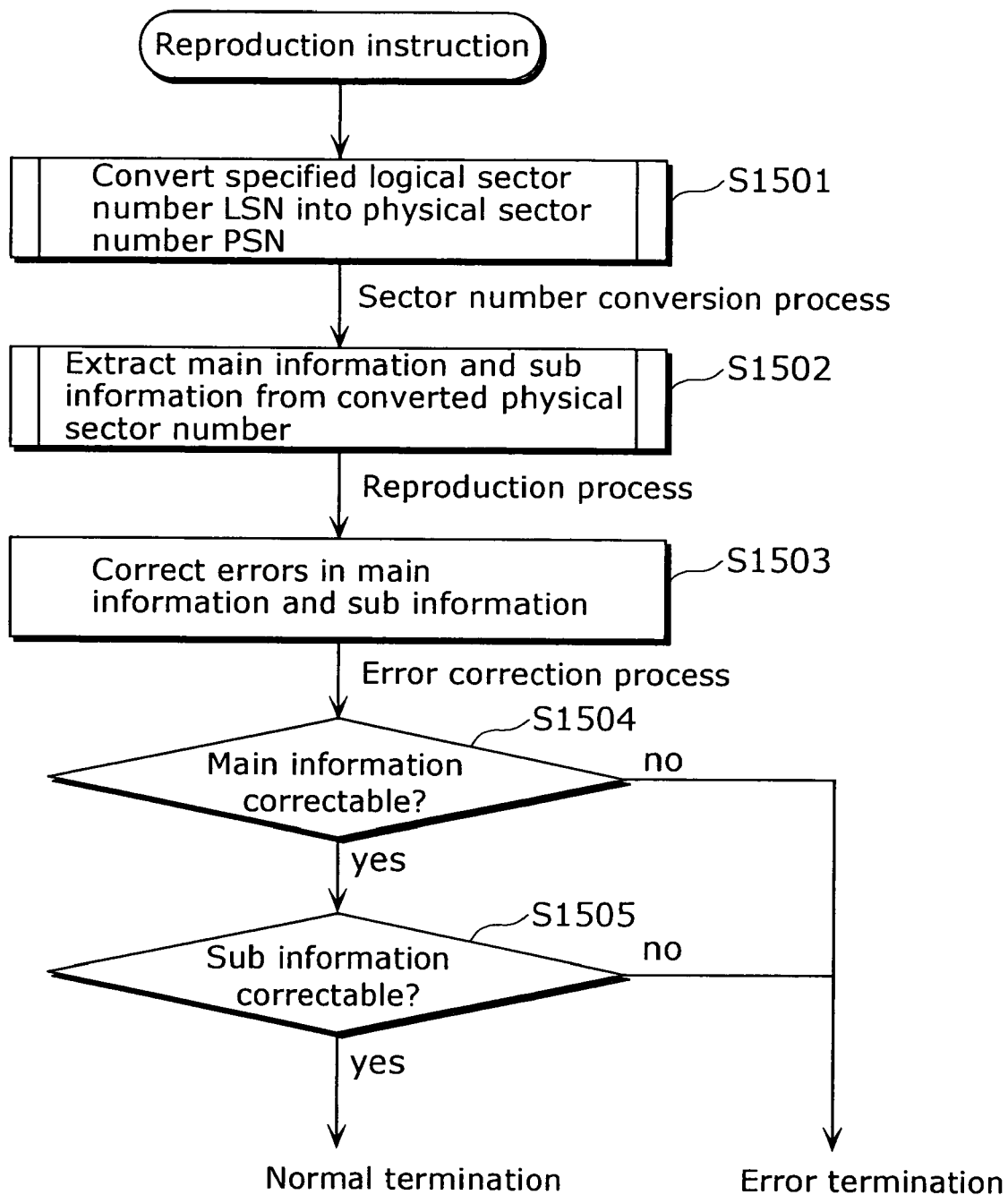
FIG. 25 is a flowchart showing a flow of a characteristic processing of the optical disc reproduction apparatus.

FIG. 25 is a flowchart showing the flow of characteristic processes of the optical disc reproduction apparatus 2. The optical disc reproduction apparatus 2 performs the following processes: the sector number conversion process for converting a logical sector number LSN specified by the system control unit 23 into a physical sector number PSN included in an optical disc itself (Step S1501); the reproduction process for reproducing main information and sub information from the physical sector number converted in the sector number conversion process (Step S1502); and the error correction process for correcting errors in the main information and the sub information (Step S1503).

Figure 26:
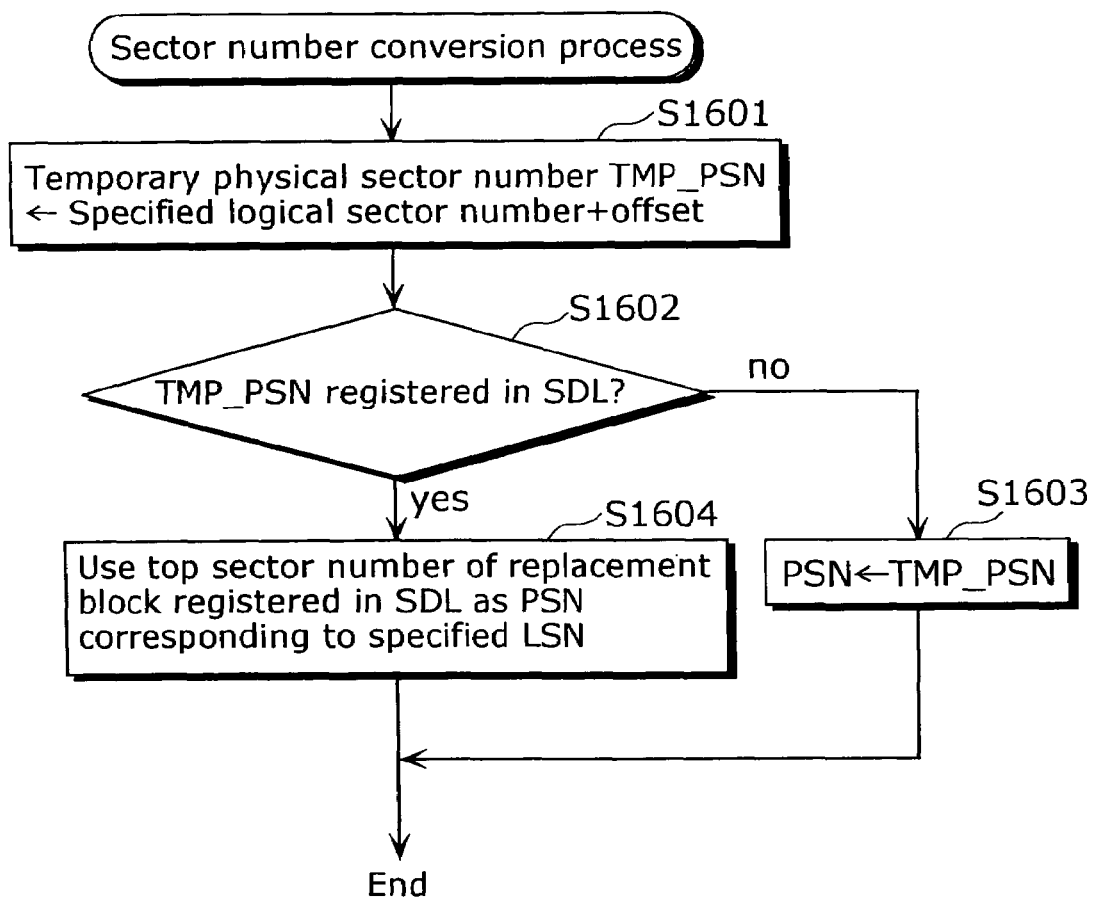
FIG. 26 is a flowchart showing a flow of a sector number conversion process performed by the optical disc reproduction apparatus.

In the sector number conversion process S1501, a process for converting a logical sector number that is specified according to a reproduction instruction from the system control unit 23 into the physical sector number of the corresponding physical sector of an optical disc. FIG. 26 is a flowchart showing the flow of the sector number conversion process. Here, the flow of converting a logical sector number specified by the system control unit 23 into a physical sector number is illustrated, for it is usual that a logical sector specified by the system control unit 23 and a physical sector do not correspond to each other from the standpoint of continuity, when such physical sector of the optical disc is a defective sector and when, therefore, it is relocated to a spare area by the optical disc recording apparatus 1. Conversion between a logical sector number and a physical sector number is performed with reference to the secondary defect list (in the present embodiment, the secondary defect list SDL for the linear defect replacement process) which is recorded inside the optical disc.

First, a temporary physical sector number TMP_PSN is determined by adding a fixed number of offsets to the logical sector number LSN requested by the system control unit 23 (Step S1601). The system control unit 23 judges whether or not such temporary physical sector number TMP_PSN is registered in the secondary defect list SDL (Step S1602). When the result of the judgment is that the temporary physical sector number TMP_PSN is not registered in the secondary defect list SDL (meaning that it is not a defective block), this temporary physical sector number TMP_PSN is outputted as a physical sector number PSN corresponding to the requested logical sector number LSN (Step S1603).

When such temporary physical sector number TMP_PSN is registered in the secondary defect list SDL (meaning that it is a defective block), on the other hand, the sector number of a replacement area registered as an SDL entry is outputted as the physical sector number PSN corresponding to the requested logical sector number LSN (Step S1604). Then, the relocation process is performed using Method B that was described when explaining the optical disc recording apparatus 1, and when there is the SDL 1909 as shown in FIG. 22B, for example, the system control unit 23 judges whether only the main information is relocated and recorded in the replacement area, whether only the sub information is relocated and recorded in the replacement area, or whether both the main information and sub information are relocated and recorded in the replacement area, on the basis of the main information defect flag 1912 and the sub information defect flag 1913 recorded in the SDL 1909.

When only the main information is relocated and recorded in the replacement area, the sector number of the replacement area registered in the SDL 1909 is outputted as the physical sector number PSN corresponding to the requested logical sector number LSN regarding the main information, and the temporary physical sector number TMP_PSN is outputted as the physical sector number PSN corresponding to the requested logical sector number LSN regarding the sub information. Meanwhile, when only the sub information is relocated and recorded in the replacement area, the sector number of the replacement area registered in the SDL 1909 is outputted as the physical sector number PSN corresponding to the requested logical sector number LSN regarding the sub information, and the temporary physical sector number TMP_PSN is outputted as the physical sector number PSN corresponding to the requested logical sector number LSN regarding the main information.

Next, in the reproduction process S1502, the system control unit 23 instructs the reproduction unit 22 to reproduce the main information and the sub information recorded on the optical disc based on the physical sector number PSN determined in the sector number conversion process S1501. The reproduction unit 22 outputs, to the system control unit 23, the main information and the sub information obtained by reproducing the optical disc. Note that the reproduction unit 22 performs reproduction in a manner which is equivalent to that of the verification/reproduction unit 13 of the optical disc recording apparatus 1.

Next, in the error correction process S1503, the system control unit 23 performs error correction by use of correcting codes included in the main information and the sub information that have been outputted by the reproduction unit 22 (There is a case where sub information possesses no correcting codes. In the present embodiment, 128-bit sub information is superimposed on an ECC block basis, the breakdown of which is 64-bit confidential information, a 48-bit error correcting code, and a 16-bit error correcting and detecting code). Then, the system control unit 23 judges whether the main information and the sub information are error-correctable or not (Steps S1504 and S1505). In the case where either the main information or the sub information becomes uncorrectable during error correction, or where error corrections are detected by the respective error correcting and detecting codes, a reproduction error is applied. Meanwhile, a normal termination shall be applied when the main information and the sub information are error-correctable and have been readout completely.

Next, an explanation is given of the case where the relocation process is performed using Method B that was described when explaining the optical disc recording apparatus 1, and the user area 1901 that includes the defective area C1903, the defective area D1904, and the defective area E1905 as shown in FIG. 22A is reproduced, for example, by the optical disc reproduction apparatus 2.

In this case, regarding the defective area C1903, since only the main information is relocated and recorded in the replacement area C'1906, the main information C is reproduced from the replacement area C'1906 and the sub information C is reproduced normally from the defective area C1903. Regarding the defective area D1904, since only the sub information is relocated and recorded in the replacement area D'1907, the main information D is reproduced normally from the defective area D1904 and the sub information D is reproduced from the replacement area D'1907. Regarding the defective area E1905, since the main information and sub information are relocated and recorded in the replacement area E'1908, the main information E and the sub information E are reproduced from the replacement area E'1908. In this manner, main information and sub information are reproduced.

As described above, even when there exists a defective area related to the recording of the main information or the sub information, or both the main information and the sub information, and where the main information or the sub information, or both the main information and the sub information i s/are recorded in a replacement area of such defective area, it is possible to reproduce the main information and the sub information from the replacement area in a stable manner, by checking the physical sector of such replacement area with reference to the secondary defect list inside an optical disc.

Moreover, even when a reproduction error of main information or a reproduction error of sub information is detected due to dust, scar, finger print and other factors on an optical disc, it is possible to prevent only the main information from being reproduced or only the sub information from being reproduced, by judging that it is a reproduction error concerning the reproduction of both the main information and the sub information.

Note that, in the present embodiment, a reproduction error of either main information or sub information is judged to be a reproduction error concerning the reproduction of both the main information and the sub information as described above, but the present invention is not limited to this. For example, a reproduction error of main information may be judged to be a reproduction error concerning the reproduction of both the main information and the sub information. The former is applicable to the case where the reproduction of sub information has a serious influence on the reproduction of main information such as in the case where a content decryption key and copying management information (the number of content transfer times, the number of content copying times etc.) are recorded as sub information. The latter, on the other hand, is applicable to the case where the reproduction of sub information does not have any influences on the reproduction of main information such as in the case where video data is recorded as main information and audio data is recorded as sub information.

Also, although relocation is conducted to a spare area when there is a defective area in the user area in the present embodiment, relocation may be conducted also to another spare area when there is a defective area in the spare area.

As is obvious from the above explanations, the optical disc defect management method according to the present invention is a defect management method for an optical disc on which main information is recorded by forming optically-readable recording marks, and on which sub information is recorded by superimposing said sub information on the main information, the optical disc defect management method comprising: a verification step of verifying whether or not the main information and the sub information have been recorded normally, every time a predetermined amount of main information and sub information are recorded; and a defective area management step of performing the following processes when it is judged in the verification step that one of (i) the main information, (ii) the sub information, and (iii) the main information and the sub information, has not been recorded normally: relocating and recording, in a predetermined spare area in the optical disc, one of (i) the main information, (ii) the sub information, and (iii) the main information and the sub information, regarding that a recording area where the recording has been performed is a defective area related to a recording of one of (i) the main information, (ii) the sub information, and (iii) the main information and the sub information; and registering, into a predetermined defect management area in the optical disc, information that associates the defective area with a replacement area inside the spare area to which said defective area has been relocated.

Accordingly, even when there exists a defective area related to the recording of the main information or the sub information, or both the main information and the sub information due to dust, scar, finger print and other factors on an optical disc, since the main information or the sub information, or both the main information and the sub information is/are relocated and recorded in a replacement area, it is possible to create an optical disc from which main information and sub information can be read out in a stable manner.

What is more, in a defective area related to the recording of main information, since only the main information can be relocated and recorded with sub information being left in such defective area, it is possible to record sub information, which is recorded in a recording method different from a recording method used for the main information, to the defective area related to the main information in which information cannot be recorded by an existing technique. This allows an efficient use of a limited space of the recording area on an optical disc.

Also, the optical disc reproduction apparatus according to the present invention is an optical disc reproduction apparatus for reading out main information and sub information by reading optically-readable recording marks from an optical disc, said sub information having been recorded by superimposing said sub information on the main information, the optical disc reproduction apparatus, comprising: a replacement area reproduction unit operable to reproduce one of (i) the main information, (ii) the sub information, and (iii) the main information and the sub information from a replacement area where a defective area is replaced and recorded, when an area from which the main information and the sub information are to be reproduced is said defective area related to a recording of one of (i) the main information, (ii) the sub information, and (iii) the main information and the sub information; and a reproduction error judgment unit operable to judge that there is a reproduction error in the main information and the sub information, while the area where said main information and said sub information are recorded is being reproduced.

Accordingly, even when there is a defective area related to the recording of the main information or the sub information, or both the main information and the sub information, and the main information or the sub information, or both the main information and the sub information is/are recorded in a replacement area corresponding to such defective area, it is possible to reproduce the main information and the sub information from this replacement area in a stable manner.

Moreover, even when a reproduction error of main information or a reproduction error of sub information is detected due to dust, scar, finger print and other factors on an optical disc, it is possible to prevent only the main information from being reproduced or only the sub information from being reproduced, by judging that it is a reproduction error concerning the reproduction of both the main information and the sub information.

Since main information and sub information can be reproduced in a stable manner even in the case where a content decryption key is recorded as sub information, for example, it is possible to circumvent such a problem as one in which an encrypted content is reproduced as it is because of the reason that the sub information is irreproducible and therefore that the content of the main information cannot be decrypted.

INDUSTRIAL APPLICABILITY

As described above, the optical disc defect management method and the optical disc reproduction method according to the present invention are suited to be employed by an optical disc recording apparatus for recording main information and recording sub information by superimposing it on such main information on an optical disc including DVD as well as by an optical disc reproduction apparatus for reproducing such main information and sub information from the optical disc.

The invention claimed is:

1. A defect management method for an optical disc on which main information is recorded by forming optically-readable recording marks, and on which sub information is recorded by superimposing the sub information on the main information, the optical disc defect management method comprising:
   a recording step of recording the main information in a recording area of the optical disc by forming the recording marks on the optical disc, and recording the sub information by superimposing the sub information on the main information, the sub information being recorded using phase modulation to displace edge positions of the recording marks;
   a verification step of judging whether or not the main information and the sub information have been recorded normally, every time a predetermined amount of main information and sub information are recorded, and when it is judged that at least one of the main information and the sub information has not been recorded normally, regarding the recording area as a defective area related to a recording of one of (i) the main information, (ii) the sub information, and (iii) the main information and the sub information; and
   a defective area management step of performing the following processes when it is judged in the verification step that at least one of the main information and the sub information has not been recorded normally:
   relocating and recording the sub information in a predetermined spare area of the optical disc; and
   registering, into a predetermined defect management area of the optical disc, information that associates the defective area with a replacement area inside the spare area to which the sub information in the defective area has been relocated.

2. The optical disc defect management method according to claim 1,
   wherein the verification step includes:
   a main information verification step of judging whether the main information has been recorded normally or not, and regarding the recording area as the defective area related to the recording of the main information, when it is judged that the main information has not been recorded normally; and
   a sub information verification step of judging whether the sub information has been recorded normally or not, and regarding the recording area as the defective area related to the recording of the sub information, when it is judged that the sub information has not been recorded normally.

3. The optical disc defect management method according to claim 2,
   wherein in the main information verification step, it is judged, based on the recorded main information and main information to be verified that is obtained by reproducing the recording area in which the main information is recorded, whether the main information to be verified is normally recorded or not.

4. The optical disc defect management method according to claim 2,
   wherein the sub information is recorded according to a sub information correlation sequence that is generated based on a predetermined pseudo random number sequence and the sub information, and
   wherein in the sub information verification step, it is judged whether the sub information has been recorded normally or not by comparing a correlation value with a predetermined threshold, the correlation value indicating a correlation between the pseudo random number sequence and a signal to be verified that is obtained by reproducing the recording area in which the sub information is recorded.

5. The optical disc defect management method according to claim 4,
   wherein the sub information is recorded by displacing each of the recording marks of the main information on the optical disc, according to the sub information correlation sequence, and
   wherein the correlation value is a correlation value between the pseudo random number sequence and a direction in which said each of the recording marks is displaced.

6. The optical disc defect management method according to claim 5,
   wherein the sub information is recorded by displacing said each of the recording marks of the main information to a position that is reached by advancing or delaying, by a minute amount, an edge of said each of the recording marks of the main information in a track direction, according to the sub information correlation sequence.

7. The optical disc defect management method according to claim 5,
wherein the sub information is recorded by displacing said each of the recording marks of the main information to a position that is reached by displacing, by a minute amount, said each of the recording marks of the main information either toward an inner radius or an outer radius from a center of a track in a radial direction, according to the sub information correlation sequence.

8. The optical disc defect management method according to claim 2,
wherein in the sub information verification step, it is judged, based on the recorded sub information and sub information to be verified that is obtained by reproducing the recording area in which said sub information is recorded, whether said sub information to be verified is recorded normally or not.

9. The optical disc defect management method according to claim 2,
wherein the sub information includes an error correcting code and an error correcting and detecting code, and
wherein in the sub information verification step, it is judged that sub information to be verified that is obtained by reproducing the recording area in which the sub information is recorded, has not been recorded normally in one of the following cases: where the sub information to be verified cannot be corrected by the error correcting code; and where an error correction is detected by the error correcting and detecting code.

10. The optical disc defect management method according to claim 2,
wherein in the defective area management step, the main information and the sub information are relocated and recorded in the spare area, when it is regarded, in one of the main information verification step and the sub information verification step, that the recording area is the defective area related to the recording of either the main information or the sub information.

11. The optical disc defect management method according to claim 2,
wherein in the defective area management step, the main information and the sub information are relocated and recorded in the spare area, when it is regarded, in the main information verification step and the sub information verification step, that the recording area is the defective area related to the recording of the main information and the sub information, and
wherein only the sub information is relocated and recorded in the spare area, when it is regarded in the main information verification step that the recording area is not the defective area related to the recording of the main information and when it is regarded in the sub information verification step that the recording area is the defective area related to the recording of the sub information.

12. The optical disc defect management method according to claim 11,
wherein in the defective area management step, information is registered into the defect management area, the information respectively indicating that the main information has been relocated and recorded and that the sub information has been relocated and recorded.

13. An optical disc recording apparatus for recording, on an optical disc, main information by forming optically-readable recording marks and recording sub information by superimposing the sub information on the main information, the optical disc recording apparatus comprising:
a recording unit operable to record the main information in a recording area of the optical disc by forming the recording marks on the optical disc, and record the sub information by superimposing the sub information on the main information, the sub information being recorded using phase modulation to displace edge positions of the recording marks;
a verification unit operable to judge whether or not the main information and the sub information have been recorded normally, every time a predetermined amount of main information and sub information are recorded, and when it is judged that at least one of the main information and the sub information has not been recorded normally, regarding the recording area as a defective area related to a recording of one of (i) the main information, (ii) the sub information, and (iii) the main information and the sub information; and
a defective area management unit operable to perform as follows when it is judged by the verification unit that at least one of the main information and the sub information has not been recorded normally:
relocate and record the sub information in a predetermined spare area of the optical disc; and
register, into a predetermined defect management area of the optical disc, information that associates the defective area with a replacement area inside the spare area to which the sub information in the defective area has been relocated.

14. The optical disc recording apparatus according to claim 13,
wherein the verification unit includes:
a main information verification unit operable to judge whether or not the main information has been recorded normally and regard the recording area as the defective area related to the recording of the main information, when it is judged that the main information has not been recorded normally; and
a sub information verification unit operable to judge whether the sub information has been recorded normally or not and regard the recording area as the defective area related to the recording of the sub information, when it is judged that the sub information has not been recorded normally.

15. An optical disc reproduction apparatus for reading out main information and sub information by reading optically-readable recording marks from an optical disc, the sub information having been recorded by superimposing the sub information on the main information,
wherein the main information is recorded in the optical disc by forming the recording marks on the optical disc, and the sub information is recorded by superimposing the sub information on the main information, the sub information being recorded using phase modulation to displace edge positions of the recording marks,
wherein the optical disc reproduction apparatus comprises:
a replacement area reproduction unit operable to reproduce the sub information from a replacement area, the replacement area being an area where a defective area is replaced and recorded, when an area from which the main information and the sub information are to be reproduced is the defective area related to a recording of at least one of the main information and the sub information; and
a reproduction error judgment unit operable to judge whether there is a reproduction error in at least one of the main information and the sub information, while the area where the main information and the sub information are recorded is being reproduced.

16. The optical disc reproduction apparatus according to claim 15,
wherein the replacement area reproduction unit judges whether the area from which the main information and the sub information are to be reproduced is the defective area or not with reference to a defect management area inside the optical disc where information that associates the defective area with the replacement area is registered, and reproduces the sub information from the replacement area corresponding to the defective area, when it is judged that the area from which the main information and the sub information are to be reproduced is the defective area.

17. The optical disc reproduction apparatus according to claim 15,
wherein the reproduction error judgment unit includes:
a main information reproduction error judgment unit operable to judge whether there is a reproduction error of the main information; and
a sub information reproduction error judgment unit operable to judge whether there is a reproduction error of the sub information,
wherein the reproduction error judgment unit judges that the reproduction error is a reproduction error of the area where the main information and the sub information are recorded, when one of the main information reproduction error judgment unit and the sub information reproduction error judgment unit judges that there is a reproduction error.

18. The optical disc reproduction apparatus according to claim 17,
wherein the sub information includes an error correcting code and an error correcting and detecting code, and
wherein the sub information reproduction error judgment unit judges that there is a reproduction error of the sub information in one of the following cases: where the sub information cannot be corrected by the error correcting code; and where an error correction is detected by the error correcting and detecting code.

19. An optical disc reproduction method for reading out main information and sub information by reading optically-readable recording marks from an optical disc, said sub information having been recorded by superimposing said sub information on the main information,
wherein the main information is recorded by forming the recording marks on the optical disc, the sub information is recorded by superimposing the sub information on the main information, the sub information being recorded using phase modulation to displace edge positions of the recording marks,
wherein the optical disc reproduction method comprises:
a replacement area reproduction step of reproducing the sub information from a replacement area, the replacement area being an area where a defective area is replaced and recorded, when an area from which the main information and the sub information are to be reproduced is the defective area related to a recording of at least one of the main information and the sub information; and
a reproduction error judgment step of judging whether there is a reproduction error in at least one of the main information and the sub information, while the area where the main information and the sub information are to be recorded is being reproduced.

20. A program embodied on a recording medium for carrying out defect management of an optical disc on which main information is recorded by forming optically-readable recording marks, and on which sub information is recorded by superimposing the sub information on the main information, the program causing an optical disc recording apparatus to execute the steps included in the optical disc defect management method according to claim 1.

21. A program embodied on a recording medium for reading out main information and reading out sub information which has been recorded by superimposing the sub information on the main information, by reading optically-readable recording marks from an optical disc, the program causing an optical disc reproduction apparatus to execute the steps included in the optical disc reproduction method according to claim 19.

22. A recording medium on which main information is recorded by forming optically-readable recording marks, and on which sub information is recorded by superimposing the sub information on the main information, the recording medium being an optical disc,
wherein the main information is recorded by forming the recording marks on the optical disc, and the sub information is recorded by superimposing the sub information on the main information, the sub information being recorded using phase modulation to displace edge positions of the recording marks,
wherein there is a defective area where at least one of the main information and the sub information has not been recorded normally,
wherein the sub information that is recorded in the defective area is relocated and recorded in a predetermined spare area in the optical disc, and
wherein information is recorded in a predetermined defect management area in the optical disc, the information associating the defective area with a replacement area inside the spare area to which the sub information in the defective area is relocated.

23. The recording medium according to claim 22,
wherein the information that associates the defective area with the replacement area includes information that respectively indicates that the main information has been relocated and recorded and that the sub information has been relocated and recorded.

* * * * *